US012627370B2

(12) United States Patent
Shariatmadari et al.

(10) Patent No.: US 12,627,370 B2
(45) Date of Patent: May 12, 2026

(54) NTN-ENTITY, USER EQUIPMENT AND BASE STATION INVOLVED IN TRANSMISSION PROCEDURE

(71) Applicant: Panasonic Intellectual Property Corporation of America, Torrance, CA (US)

(72) Inventors: Hamidreza Shariatmadari, Langen (DE); Hidetoshi Suzuki, Kanagawa (JP); Quan Kuang, Langen (DE); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 340 days.

(21) Appl. No.: 18/257,254

(22) PCT Filed: Nov. 4, 2021

(86) PCT No.: PCT/EP2021/080635
§ 371 (c)(1),
(2) Date: Jun. 13, 2023

(87) PCT Pub. No.: WO2022/128245
PCT Pub. Date: Jun. 23, 2022

(65) Prior Publication Data
US 2024/0056171 A1 Feb. 15, 2024

(30) Foreign Application Priority Data
Dec. 15, 2020 (EP) ..................................... 20214319

(51) Int. Cl.
*H04B 7/185* (2006.01)
(52) U.S. Cl.
CPC ..... *H04B 7/18513* (2013.01); *H04B 7/18519* (2013.01)

(58) Field of Classification Search
CPC ............ H04B 7/18513; H04B 7/18519; H04B 7/18543; H04B 7/18504; H04W 72/20;
(Continued)

(56) References Cited

U.S. PATENT DOCUMENTS 10,153,831 B1 * 12/2018 Gokhale .............. H04B 7/0617
11,871,332 B2 * 1/2024 Määttänen ............ H04W 60/02
(Continued)

FOREIGN PATENT DOCUMENTS

GB 2582662 A 9/2020

OTHER PUBLICATIONS

3GPP, "3rd Generation Partnership Project; Technical Specification Group Radio Access Network; NG-RAN; Architecture description (Release 16)," 3GPP TS 38.401 V16.3.0, Sep. 2020. (78 pages).
(Continued)

*Primary Examiner* — Dhaval V Patel
(74) *Attorney, Agent, or Firm* — Seed Intellectual Property Law Group LLP

(57) ABSTRACT

The present disclosure relates to an NTN entity comprising the following. A receiver of the NTN entity receives a channel status report from a user equipment, UE, the channel status report providing information on a channel between the UE and the NTN entity. A transmitter of the NTN entity forwards the received channel status report to a base station. The receiver receives scheduling information from the base station regarding a downlink or uplink transmission of the data with for the UE. A processor of the NTN entity determines an updated channel status. The processor determines whether to adapt a transmission power for the downlink or uplink transmission according to the received scheduling information, based on the updated channel status. The
(Continued)

processor, when having determined to adapt the transmission power, adapts the transmission power for the downlink or uplink transmission.

18 Claims, 10 Drawing Sheets

(58) Field of Classification Search
CPC .. H04W 72/542; H04W 52/241; H04W 52/46
See application file for complete search history.

(56) References Cited

U.S. PATENT DOCUMENTS

| | | | | | |
|---|---|---|---|---|---|
| 11,985,618 | B2 * | 5/2024 | Narasimha | ......... | H04B 7/18506 |
| 2019/0363843 | A1 | 11/2019 | Gordaychik | | |
| 2022/0039026 | A1 * | 2/2022 | Sharma | ............... | H04W 52/242 |
| 2022/0225290 | A1 * | 7/2022 | Ganesan | ............ | H04W 84/005 |
| 2023/0422195 | A1 * | 12/2023 | Yao | .................... | H04B 7/18513 |

OTHER PUBLICATIONS

3GPP, "3rd Generation Partnership Project; Technical Specification Group Radio Access Network; NR; Medium Access Control (MAC) protocol specification (Release 16)," 3GPP TS 38.321 V16.2.1, Sep. 2020. (154 pages).

3GPP, "3rd Generation Partnership Project; Technical Specification Group Radio Access Network; NR; NR and NG-RAN Overall Description; Stage 2 (Release 16)," 3GPP TS 38.300 V16.3.0, Sep. 2020. (148 pages).

3GPP, "3rd Generation Partnership Project; Technical Specification Group Radio Access Network; NR; Physical channels and modulation (Release 16)," 3GPP TS 38.211 V16.3.0, Sep. 2020. (133 pages).

3GPP, "3rd Generation Partnership Project; Technical Specification Group Radio Access Network; Solutions for NR to support non-terrestrial networks (NTN) (Release 16)," 3GPP TR 38.821 V16.0.0, Dec. 2019. (140 pages).

3GPP, "3rd Generation Partnership Project; Technical Specification Group Radio Access Network; Study on New Radio (NR) to support non-terrestrial networks (Release 15)," 3GPP TR 38.811 V15.4.0, Sep. 2020. (127 pages).

3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).

3GPP, "3rd Generation Partnership Project; Technical Specification Group Services and System Aspects; System architecture for the 5G System (5GS); Stage 2 (Release 16)," 3GPP TS 23.501 V16.6.0, Sep. 2020. (447 pages).

Extended European Search Report, dated Jul. 15, 2021, for European Patent Application No. 20214319.4-1215. (12 pages).

International Search Report, mailed Feb. 23, 2022, for PCT Patent Application No. PCT/EP2021/080635. (4 pages).

ITU, "IMT Vision—Framework and overall objectives of the future development of IMT for 2020 and beyond," Recommendation ITU-R M.2083-0, Sep. 2015. (21 pages).

* cited by examiner

AMF/UPF AMF/UPF

5GC

NG-C/NG-U NG-C/NG-U NG-C/NG-U

NG-C/NG-U NG-C/NG-U NG-C/NG-U

NG-C/NG-U NG-C/NG-U NG-C/NG-U

Xn gNB gNB

NG-RAN

Xn Xn

Xn ng-eNB ng-eNB

Fig. 1

| gNB or ng - eNB |
|---|
| Inter Cell RRM |
| RB Control |
| Connection Mobility Cont. |
| Radio Admission Control |
| Measurement Configuration & Provision |
| Dynamic Resource Allocation (Scheduler) |

NG - RAN

| AMF |
|---|
| NAS Security |
| Idle State Mobility Handling |

| SMF |
|---|
| UE IP address allocation |
| PDU Session Control |

| UPF |
|---|
| Mobility Anchoring |
| PDU Handling | internet

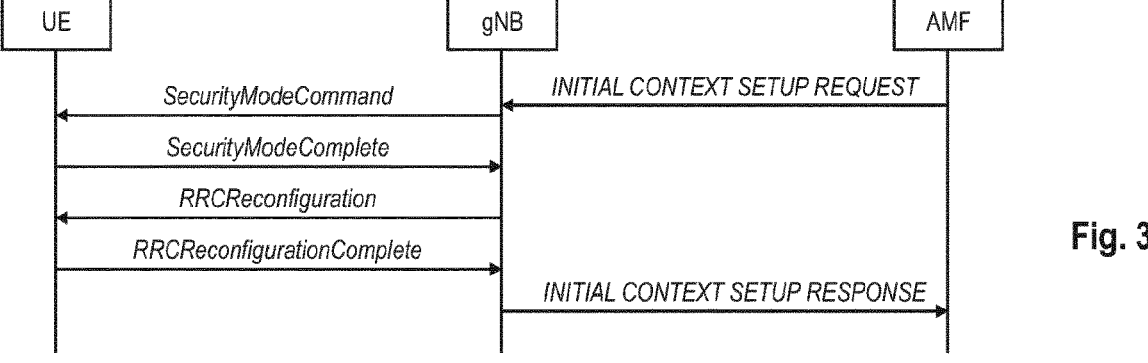

Fig. 3

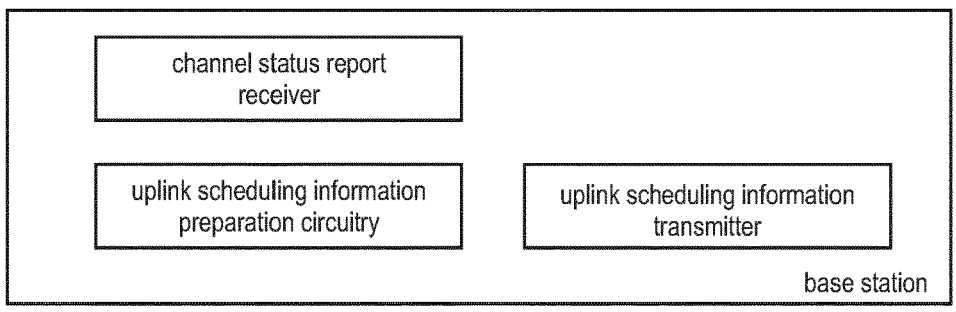

channel status report
receiver uplink scheduling information
preparation circuitry uplink scheduling information
transmitter base station

Fig. 14

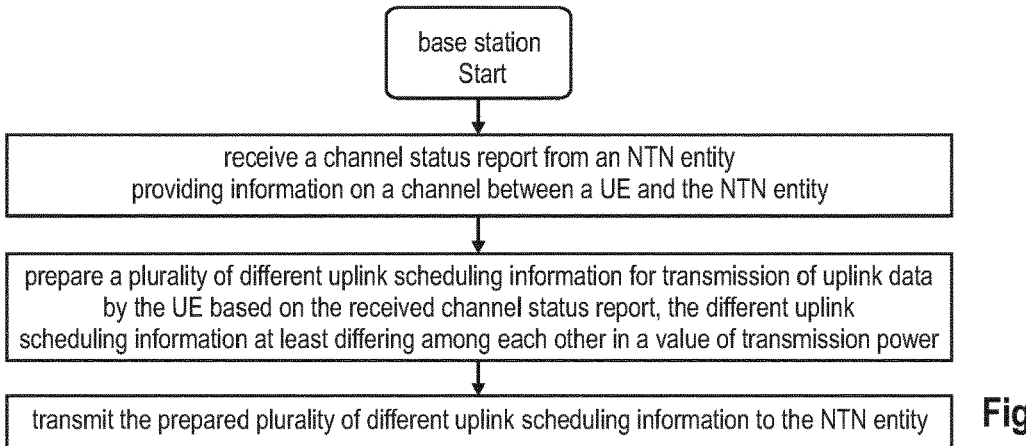

base station
Start receive a channel status report from an NTN entity
providing information on a channel between a UE and the NTN entity prepare a plurality of different uplink scheduling information for transmission of uplink data
by the UE based on the received channel status report, the different uplink
scheduling information at least differing among each other in a value of transmission power transmit the prepared plurality of different uplink scheduling information to the NTN entity

Fig. 15

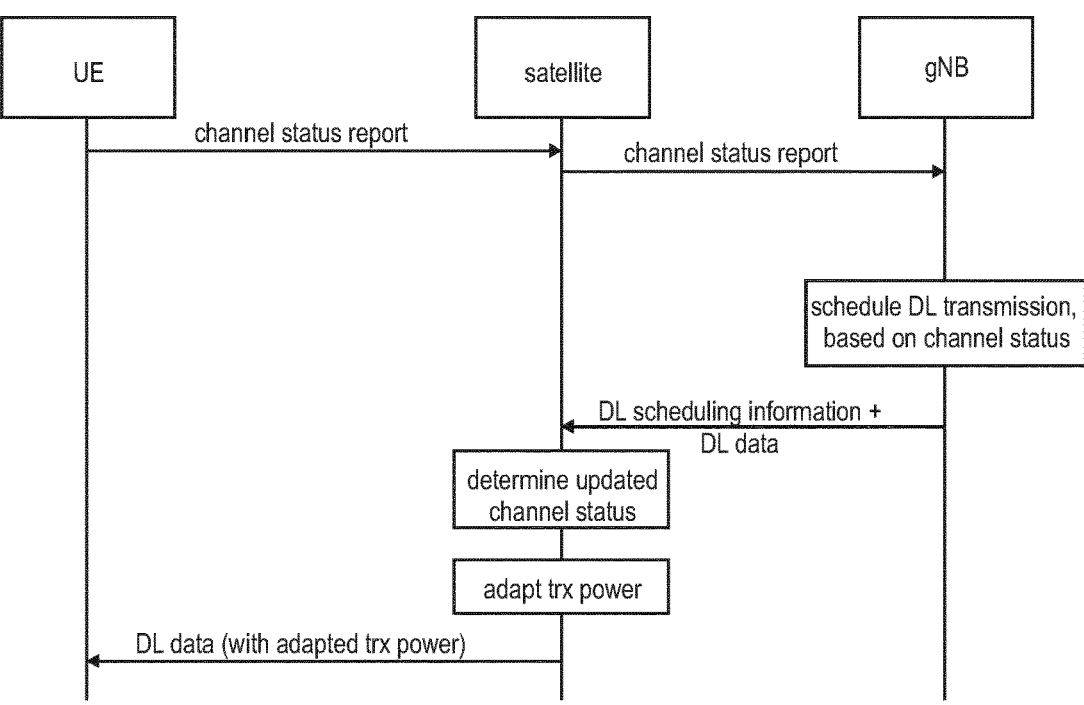

UE satellite gNB channel status report channel status report schedule DL transmission,
based on channel status DL scheduling information +
DL data determine updated
channel status adapt trx power DL data (with adapted trx power)

Fig. 16

```
┌────────┐              ┌──────────┐              ┌────────┐
│   UE   │              │ satellite │              │  gNB   │
└────────┘              └──────────┘              └────────┘
    │    channel status report   │                    │
    │───────────────────────────▶│  channel status report
    │                            │───────────────────────▶│
    │                            │                    ┌─────────────────────┐
    │  updated channel status report                  │ schedule DL transmission,│
    │───────────────────────────▶│                    │ based on channel status │
    │                            │                    └─────────────────────┘
    │                            │   DL scheduling information +
    │                            │◀───────── DL data (priority)
    │                       ┌──────────────┐
    │                       │determine updated│
    │                       │channel status  │
    │                       └──────────────┘
    │                       ┌──────────────────┐
    │                       │determine whether to│
    │                       │cancel DL transmission?│
    │                       └──────────────────┘
    │                       ┌──────────────────┐
    │                       │cancel DL transmission│
    │                       └──────────────────┘
    │                            │      early NACK     │
    │                            │───────────────────────▶│
    │                            │  updated channel status report
    │                            │───────────────────────▶│
    │                            │                    ┌─────────────────────────┐
    │                            │                    │ re-schedule DL transmission,│
    │  updated channel status report                  │ based on updated channel status│
    │───────────────────────────▶│                    └─────────────────────────┘
    │                            │   DL scheduling information +
    │                            │◀───────── DL data (priority)
    │                       ┌──────────────┐
    │                       │determine updated│
    │                       │channel status  │
    │                       └──────────────┘
    │                       ┌──────────────────┐
    │                       │determine whether to│
    │                       │cancel DL transmission?│
    │                       └──────────────────┘
    │                       ┌──────────────┐
    │                       │adapt trx power│
    │                       └──────────────┘
    │ DL data (with adapted trx power)
    │◀───────────────────────────│                    │
```

Fig. 17

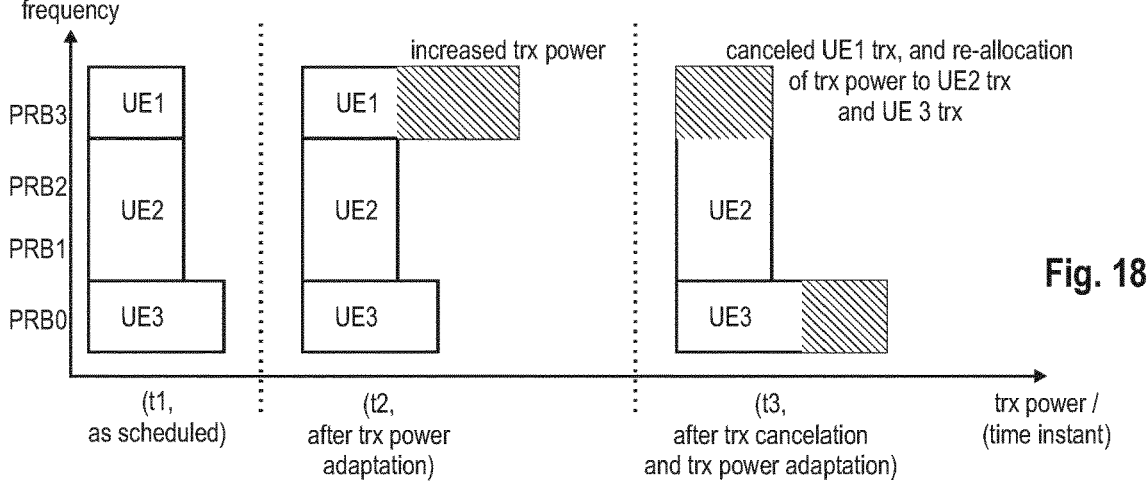

Fig. 18

NTN-ENTITY, USER EQUIPMENT AND BASE STATION INVOLVED IN TRANSMISSION PROCEDURE

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 16.0.0), at least including enhanced mobile broadband (eMBB), ultra-reliable low-latency communications (URLLC), and massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing procedures for facilitating an NTN entity to participate in the improved transmission procedure. UE to perform.

In an embodiment, the techniques disclosed here feature a non-terrestrial network, NTN, entity comprising the following. A receiver of the NTN entity receives a channel status report from a user equipment, UE, the channel status report providing information on a channel between the UE and the NTN entity. A transmitter of the NTN entity forwards the received channel status report to a base station. The receiver receives scheduling information from the base station regarding a downlink or uplink transmission of the data with for the UE. A processor of the NTN entity determines an updated channel status. The processor determines whether to adapt a transmission power for the downlink or uplink transmission according to the received scheduling information, based on the updated channel status. The processor, when having determined to adapt the transmission power, adapts the transmission power for the downlink or uplink transmission.

It should be noted that general or specific embodiments may be implemented as a system, a method, an integrated circuit, a computer program, a storage medium, or any selective combination thereof. For instance, an integrated circuit can control a process of a UE or base station.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 1 shows an exemplary architecture for a 3GPP NR system;

FIG. 2 is a schematic drawing that shows a functional split between NG-RAN and 5GC.

FIG. 3 is a sequence diagram for RRC connection setup/reconfiguration procedures.

FIG. 14 illustrates a structure of the base station according to an exemplary implementation of the improved transmission procedure, FIG. 15 is a flow diagram for the base station behavior, according to an exemplary implementation of the improved transmission procedure.

FIG. 16 illustrates a general and simplified message exchange between the UE, satellite and gNB, for an improved transmission procedure in the downlink.

FIG. 17 illustrates a general and simplified message exchange between the UE, satellite and gNB, for different variants of an improved transmission procedure in the downlink, FIG. 18 illustrates the transmission power adaptation for the three Ues.

DETAILED DESCRIPTION

Figure 4:
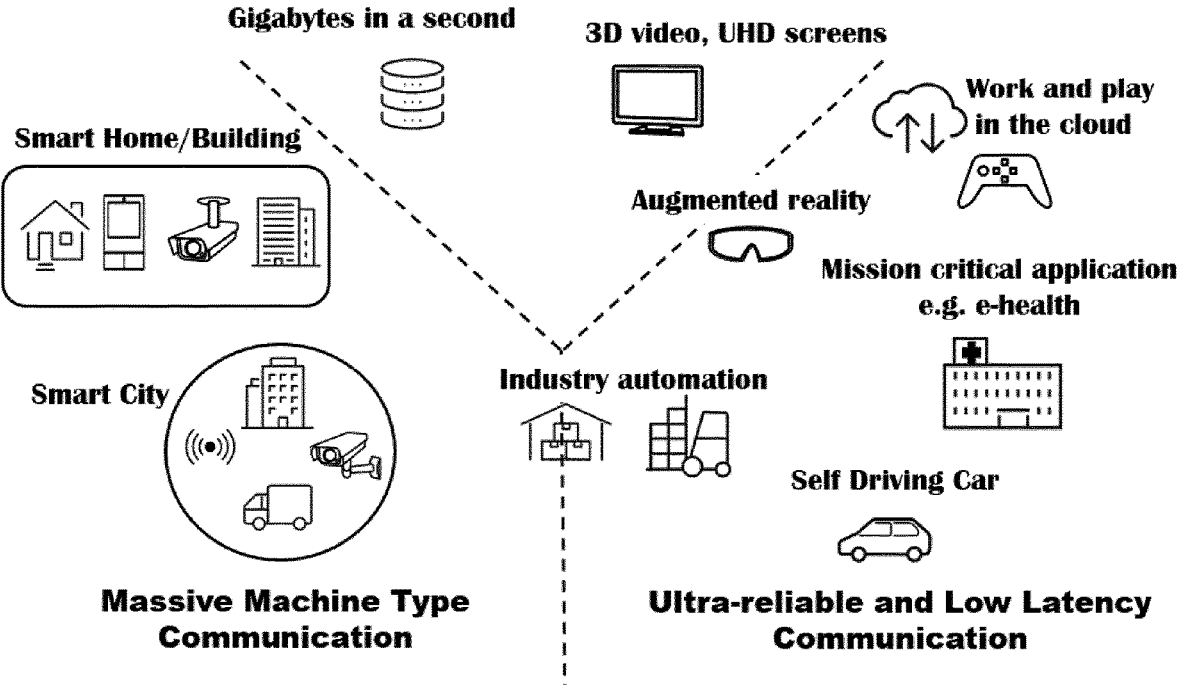
FIG. 4 is a schematic drawing showing usage scenarios of Enhanced mobile broadband (eMBB). Massive Machine Type Communications (mMTC) and Ultra Reliable and Low Latency Communications (URLLC)

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v16.3.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel). PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1.000.000 devices/$km^2$ in an urban environment), large coverage in harsh environments, and extremely long-life battery for low cost devices (15 years).

Therefore, the OFDM numerology (e.g., subcarrier spacing. OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.3.0. e.g., section 4). For instance, downlink and uplink transmissions are organized into frames with 10 ms duration, each frame consisting of ten subframes of respectively 1 ms duration. In 5 g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

5G NR Functional Split Between NG-RAN and 5GC

FIG. 2 illustrates functional split between NG-RAN and 5GC. NG-RAN logical node is a gNB or ng-cNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of Ues in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signalling termination;

NAS signalling security;

Access Stratum, AS, Security control;

Inter Core Network, CN, node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g., packet filtering, gating, UUDL rate enforcement;

Uplink Traffic verification (SDF to QoS flow mapping);

Downlink packet buffering and downlink data notification triggering.

Finally, the Session Management function, SMF, hosts the following main functions:

Session Management;

UE IP address allocation and management;

Selection and control of UP function;

Configures traffic steering at User Plane Function. UPF, to route traffic to proper destination;

Control part of policy enforcement and QoS;

Downlink Data Notification.

RRC Connection Setup and Reconfiguration Procedures

FIG. 3 illustrates some interactions between a UE, gNB, and AMF (a 5GC entity) in the context of a transition of the UE from RRC_IDLE to RRC_CONNECTED for the NAS part (see TS 38.300).

RRC is a higher layer signaling (protocol) used for UE and gNB configuration. In particular, this transition involves that the AMF prepares the UE context data (including, e.g., PDU session context, the Security Key. UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a Security-ModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF. SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element (IE) to the UE via the signaling radio bearer. The UE then performs an uplink transmission or a downlink reception based on the resource allocation configuration.

Usage Scenarios of IMT for 2020 and Beyond

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see. e.g., ITU-R M.20183 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913 version 16.0.0. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/ Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also, PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so). e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
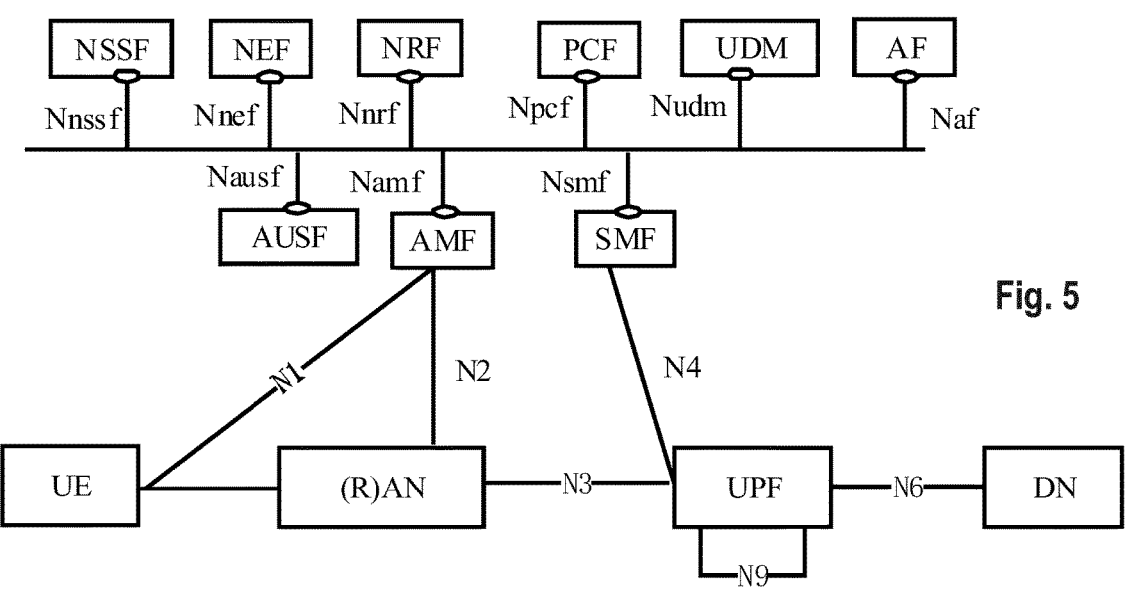
FIG. 5 is a block diagram showing an exemplary 5G system architecture for a non-roaming scenario.

FIG. 5 illustrates a 5G NR non-roaming reference architecture (see TS 23.501 v16.6.0, section 4.2.3). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN). e.g., operator services. Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMBB and mMTC services to at least one of functions (for example NEF. AMF, SMF. PCF, UPF, etc.) of the 5GC to establish a PDU session including a radio bearer between a gNodeB and a UE in accordance with the QoS requirement and control circuitry, which, in operation, performs the services using the established PDU session.

Non-Terrestrial Networks, NTN

Satellites will continue to be the most effective means for reaching areas beyond terrestrial coverage as well as for reaching passengers in trains, aircrafts & vessels. Therefore, including satellites as an integral part of the 5G ecosystem adds resilience. The satellite industry has participated in various committees, including in 3GPP, EC and ITU-T to ensure that satellite systems are integrated as an intrinsic part of the 5G ecosystem. The targets are 1) to support highly available and reliable connectivity using satellites for use cases such as ubiquitous coverage, disaster relief, public safety requirements, emergency response, remote sensor connectivity, broadcast service, etc., 2) to support an air-interface with one-way latency of up to 275 ms when satellite connection is involved, and 3) to support seamless mobility between terrestrial and satellite-based networks with widely varying latencies.

In 3GPP, NR-based operation in a non-terrestrial network (NTN) is studied and described (see, e.g., 3GPP TR 38.811. Study on New Radio (NR) to support non-terrestrial networks, version 15.4.0, and 3GPP TR 38.821. Solutions for NR to support non-terrestrial networks, version 16.0.0).

A non-terrestrial network (NTN) refers to a network, or segment of networks, using RF resources on board of an airborne or spaceborne entity for transmission, such as, e.g.:

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

Exemplary, a UAS or satellite platform is connected to the 5G network through one or several gateways linked to the data network. NTNs may comprise the following system elements: an NTN-capable terminal, which may refer to a 3GPP UE or a terminal that is specific to the satellite system in case a satellite does not serve directly 3GPP UEs; a service link which refers to the radio link between the user equipment and the space/airborne platform; an airborne platform embarking a payload; gateways that connect the space/airborne platform to the core network; feeder links which refer to the radio links between the Gateway Center space/airborne platform. The platform can implement either transparent or regenerative payload transmissions, with the following exemplary characteristics.

In the transparent payload, the platform acts as a repeater by filtering, converting, and amplifying the wave signal, while the payload is unchanged.

In the regenerative payload, the platform has some or all of the base station functionalities. It may perform demodulation/modulation, switching/routing, coding/decoding in addition to radio frequency filtering, conversion and amplification.

The Inter-satellite links (ISL) can optionally be used to form a constellation of satellites. ISL (Inter-Satellite Links) is a transport link between satellites.

Figure 6:
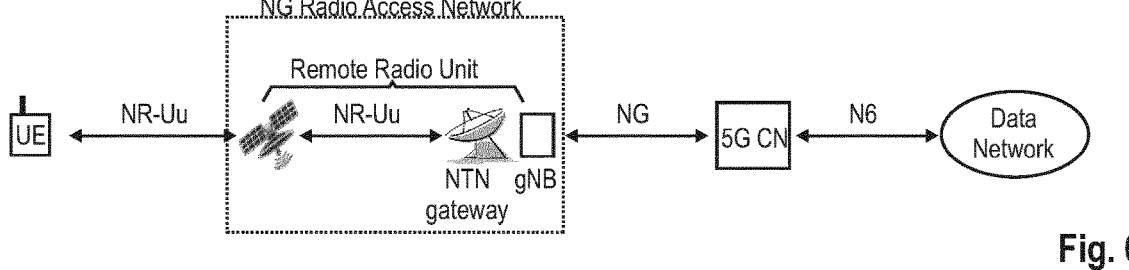
FIG. 6 illustrates an exemplary NG RAN architecture based on a transparent satellite.

FIG. 6 illustrates an exemplary NG RAN architecture based on a transparent satellite. According to one exemplary implementation (see TR 38.821 section 5.1), the satellite payload implements frequency conversion and a Radio Frequency amplifier in both uplink and downlink direction. It corresponds to an analogue RF repeater. Hence, the satellite repeats the NR-Uu radio interface from the feeder link (between the NTN gateway and the satellite) to the service link (between the satellite and the UE) and vice versa. The Satellite Radio Interface (SRI) on the feeder link is the NR-Uu. In other words, the satellite does not terminate NR-Uu.

Figure 7:
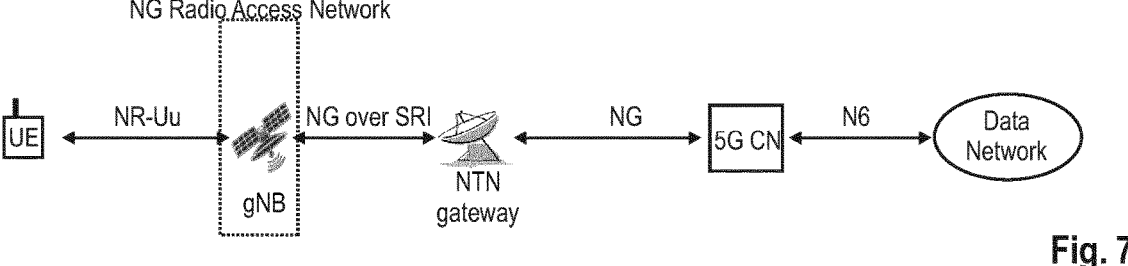
FIG. 7 illustrates an exemplary NG RAN architecture based on a regenerative satellite.

FIG. 7 illustrates an exemplary NG RAN architecture based on a regenerative satellite. According to one exemplary implementation (see TR 38.321 section 5.2), the NG-RAN logical architecture as described in TS 38.401 is used as baseline for NTN scenarios. The satellite payload implements regeneration of the signals received from Earth. The NR-Uu radio interface is on the service link between the UE and the satellite. The Satellite Radio Interface (SRI) is on the feeder link between the NTN gateway and the satellite. SRI (Satellite Radio Interface) is a transport link between the NTN GW and satellite.

Figure 8:
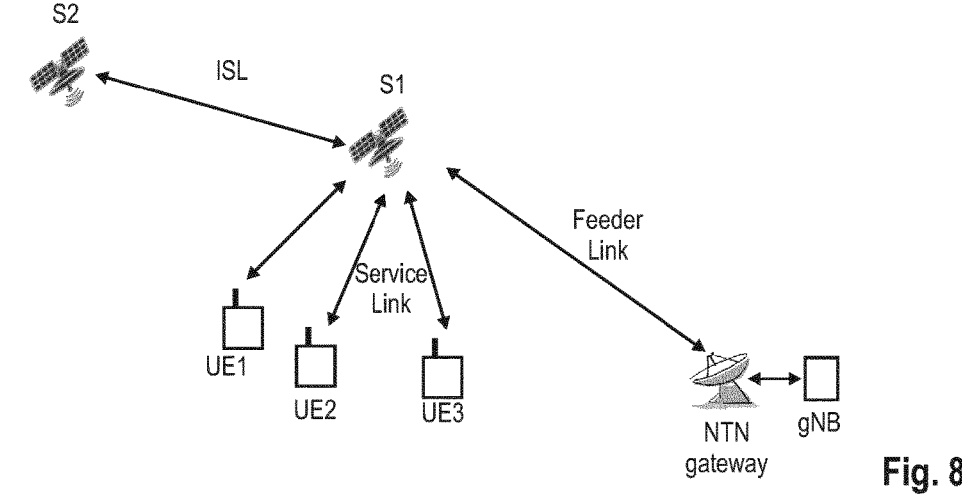
FIG. 8 illustrates an exemplary scenario where several UEs are served by a satellite.

FIG. 8 illustrates an exemplary scenario where three UEs (UE1, UE2, UE3) are served by a satellite S1. The satellite S1 is communicating via a feeder link with a gNB and NTN gateway as well as via an inter-satellite link (ISL) with another neighbor satellite S2.

There are different types of satellites that provide communications, Low-Earth Orbit (LEO) or Geosynchronous Equatorial Orbit (GEO) (also called geo-stationary) satellites. Geostationary satellites appear fixed as they move at the same angular velocity as the Earth and orbit along a path parallel to Earth's rotation, thereby providing coverage to a specific area. From the ground, GEO satellites appear to be stationary. LEO satellites revolve at an altitude between 160 to 2.000 kilometers (99 to 1,200 miles). A constellation of LEO satellites can provide continuous, global coverage as the satellite moves. Unlike GEO satellites. LEO satellites also fly at a much faster pace because of their proximity to Earth.

There are many applications for GEO satellites, including weather forecasting, satellite radio, and television. Because GEO satellites orbit at such a high altitude, however, there is a longer communication time lag (latency) as the signals travel to and from these satellites. For this reason, many critical communications are handled over LEO satellite networks, which allow for faster connectivity without wires or cables.

Functionality of repeaters and relays are already known in 3GPP. e.g., from LTE Advanced. These are also known as L1 and L2 relaying, respectively, and could be used for coverage enhancement in a cell. The L1 repeater performs the amplify-and-forward, imposing a very short delay, typically a fraction of a μs. An advanced repeater, also known as smart repeater, is a type with a feature of time/frequency-selective repetition. This allows repeating only the signals for the served user equipments (UEs), which reduces the interference in the cell and also the power consumption of the repeater. The L2 repeater carries out decoding/re-decoding operations, which impose a higher delay, typically a few ms. However, despite the functional similarities between the repeaters in LTE-Advanced and NTN, they would have fundamentally different designs. e.g., due to the different backhaul links and their associated round trip time (RTT).

Further Improvements

One of the main issues of the integration of NTN into 5G is the long RTT, which is in the range of 25-540 ms, depending on the satellite orbit. The large RTT can severely affect the performance of the user scheduling, especially, in the transparent payload scenario (see above). This is due to the fact that the channel conditions for the UE can vary a lot between the time instance the UE is scheduled by the gNB and the time instance the data is exchanged between the UE and the satellite (uplink or downlink). For instance, there is a high chance that the data transmission fails, if the channel condition becomes severely worse after the UE is scheduled for a downlink/uplink transmission.

The NTN platforms, including UAS and satellite, are also limited with the total transmission power due to the limited power sources onboard. Hence, efficient power allocation is an important concern for NTN, too.

The inventors have identified the above-discussed potential drawbacks and challenges and have thus identified the possibility of providing an improved transmission procedure that involves satellites and allows avoiding or mitigating one or more of the above-identified problems. The present disclosure relates to different solutions and variants for such an improved transmission procedure.

EMBODIMENTS

In the following. UEs, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been and are made herein so as to be able to explain the principles underlying the present disclosure in a clear, concise and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology, but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

The term Non-terrestrial network, NTN, entity can be broadly understood as an entity of the non-terrestrial network, such as spaceborne vehicles or airborne vehicles, as introduced in the above section relating to NTN. In the following, satellites will be assumed only as an example for such an NTN entity, while it should remain clear that also the other examples of NTN entities are covered.

For the following solutions it is exemplarily assumed that the improved transmission procedure is performed as part of a data transmission between the UE, via a satellite, and the base station (e.g., gNB). The scenario already introduced above of FIG. 8 can be assumed exemplarily in the following. For sake of simplifying the explanation, it is exemplarily assumed that the gateway and gNB are collocated, thus avoiding a formal separation of the gateway and the gNB (base station) in the subsequent explanations. Consequently, in the following, the improved transmission procedure will be described as occurring between the UE, the NTN entity, and the gNB, without specifically mentioning that a gateway is located between the NTN entity and the gNB.

Figure 9:
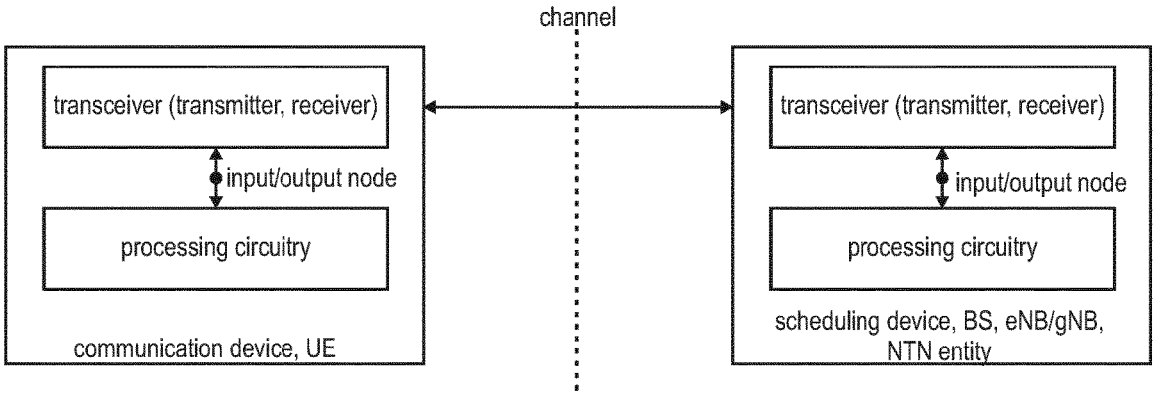
FIG. 9 illustrates an exemplary and simplified structure of a UE, gNB, and NTN entity.

FIG. 9 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver. Furthermore, the NTN entity can have the same or similar structure as the scheduling device. e.g., including a transceiver and processing circuitry.

Both devices may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

Different implementations of an improved transmission procedure will be described in the following. In said connection, improved entities, such as improved UEs, improved NTN entities, and improved base stations are presented, which participate in the improved transmission procedure. Corresponding methods for the UE, NTN entity and BS behavior are provided as well.

Figure 10:
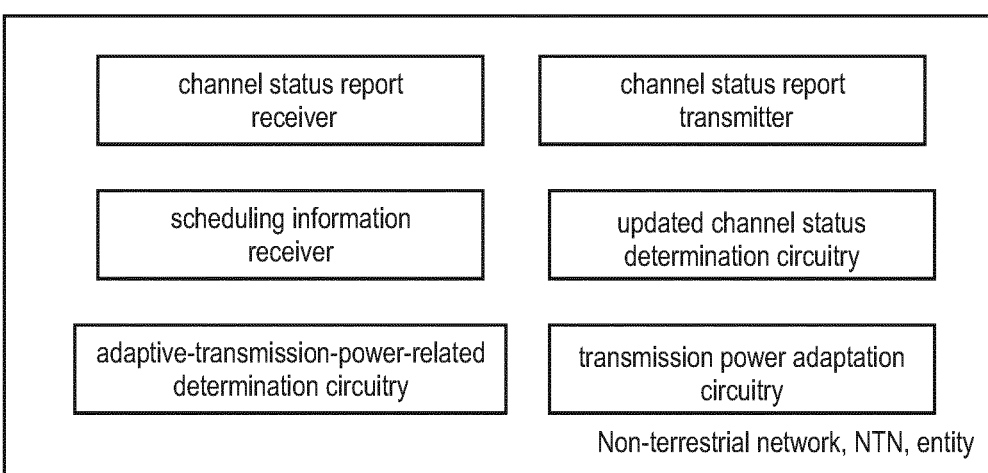
FIG. 10 illustrates a structure of the NTN entity according to an exemplary implementation of an improved transmission procedure.

FIG. 10 illustrates a simplified and exemplary structure of an NTN entity (such as a satellite) according to one exemplary solution of the improved transmission procedure, which can be implemented based on the general device structure explained in connection with FIG. 9. The various structural elements of the NTN entity illustrated in said figure can be interconnected between one another, e.g., with corresponding input/output nodes (not shown). e.g., in order to exchange control and user data and other signals. Although not shown for illustration purposes, the NTN entity may include further structural elements.

As apparent from FIG. 10, the NTN entity may include a channel status report receiver, a channel status report transmitter, a scheduling information receiver, and updated channel status determination circuitry, an adaptive-transmission-power-related determination circuitry, and transmission power adaptation circuitry.

In the present case as will become apparent from the below disclosure, the receiver of the NTN entity can thus be exemplarily configured to at least partly perform one or more of receiving a channel status report, receiving an updated channel status report, receiving scheduling information, receiving data, receiving configuration information, etc.

Furthermore, in the present case as will become apparent from the below disclosure, the processing circuitry (also termed processor) of the NTN entity can thus be exemplarily configured to at least partly perform one or more of determining an updated channel status, determining whether and how much to adapt a transmission power for an uplink or downlink transmission, determining whether or not to cancel a scheduled downlink/uplink transmission, determining a priority associated with downlink data, selecting a suitable uplink scheduling information among a plurality of same, adapting an uplink scheduling information (part of it), performing estimations as to whether a schedule transmission is likely to succeed or fail, etc.

Furthermore, in the present case as will become apparent from the below disclosure, the transmitter of the NTN entity can thus be exemplarily configured to at least partly perform one or more of forwarding the received channel status report to the base station, transmitting data to the UE using a particular transmission power, forwarding uplink scheduling information to the UE, transmitting an updated channel status report to the base station, transmitting a negative acknowledgment to the base station, etc.

One exemplary solution as will be disclosed in more detail further below is implemented by a NTN entity that includes the following. A receiver of the NTN entity receives a channel status report from a user equipment, UE, the channel status report providing information on a channel between the UE and the NTN entity. A transmitter of the NTN entity forwards the received channel status report to a base station. The receiver receives scheduling information from the base station regarding a downlink or uplink transmission of data for the UE. A processor of the NTN entity determines an updated channel status. The processor determines whether to adapt a transmission power for the downlink or uplink transmission according to the received scheduling information, based on the updated channel status. The processor, when having determined to adapt the transmission power, adapts the transmission power for the downlink or uplink transmission.

Figure 11:
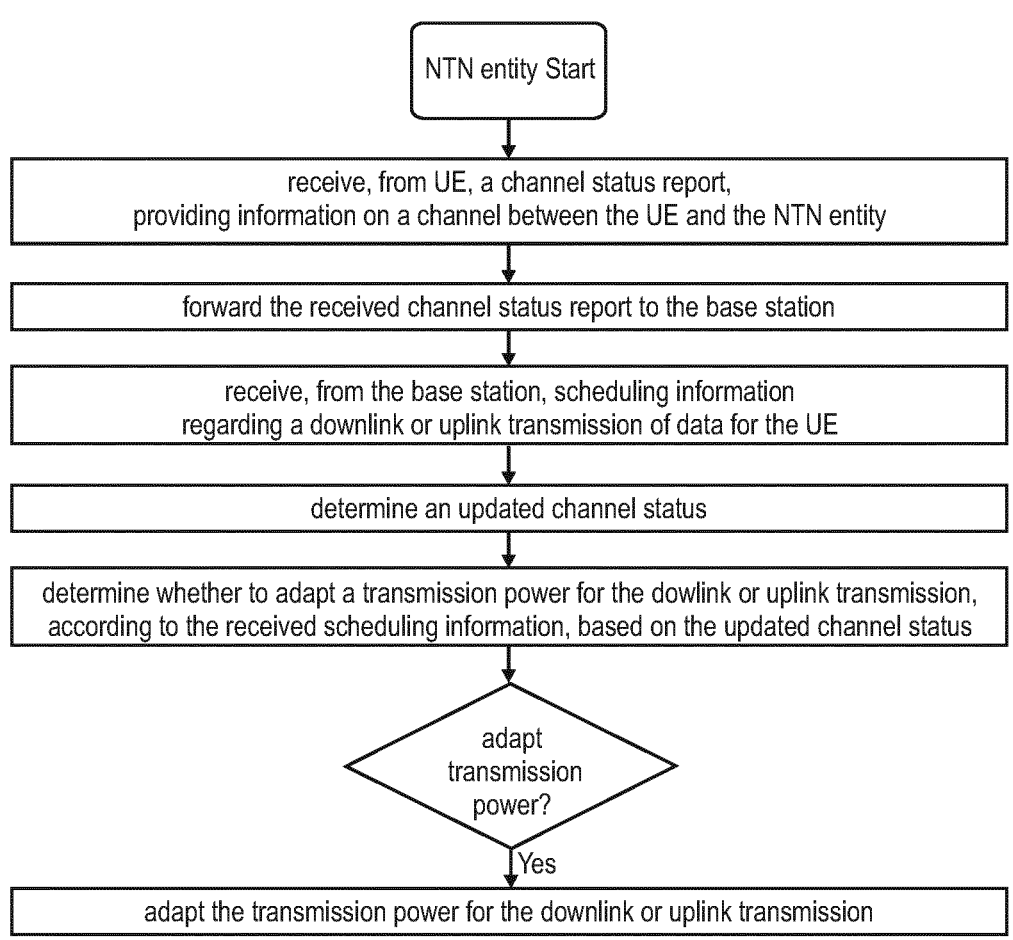
FIG. 11 is a flow diagram for the NTN entity behavior, according to an exemplary implementation of the improved transmission procedure.

A corresponding sequence diagram for an exemplary UE behavior in line with the above-discussed UE is defined in the following and illustrated in FIG. 11. The method comprises the following steps performed by a user equipment:

receiving a channel status report from a user equipment, UE, the channel status report providing information on a channel between the UE and the NTN entity,
    forwarding the received channel status report to a base station,
    receiving scheduling information from the base station regarding a downlink or uplink transmission of data for the UE,
    determining an updated channel status,
    determining whether to adapt a transmission power for the downlink or uplink transmission according to the received scheduling information, based on the updated channel status,
    when having determined to adapt the transmission power, adapting the transmission power for the downlink or uplink transmission.

According to this improved transmission procedure, it is possible to control the transmission power of the uplink or downlink transmission based on previously determined updated channel status. By directly obtaining and using the updated channel status at the NTN entity, the excessive round-trip delay is avoided and the actual channel condition of the channel between the NTN entity and the UE can be taken into account for the uplink and downlink transmission. For instance, the transmission power can be adapted (e.g., increased) so as to compensate for a deterioration of the channel quality compared to the channel quality that was indicated by the channel status report and on which basis the base station scheduled the downlink or uplink transmission. On the other hand, the transmission power could be decreased so as to avoid using excess transmission power in situations where the channel quality has improved compared to the channel quality that was indicated to the base station by the channel status report.

Consequently, the adaptive transmission power solution described above overcomes the drawbacks identified above for scenarios where the channel conditions vary a lot between the time instance the UE is scheduled by the base station and the time instance the data is exchanged between the UE and the NTN entity (e.g., satellite) (uplink or downlink).

Figure 12:
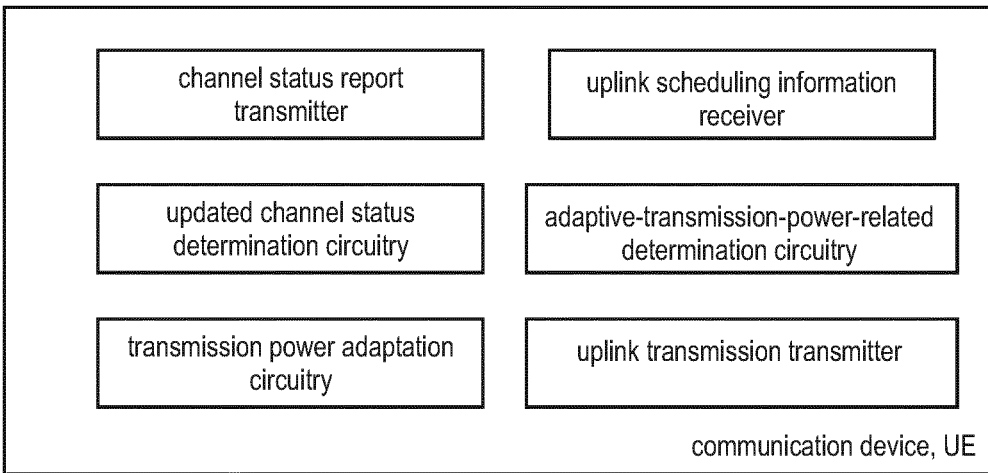
FIG. 12 illustrates a structure of the UE according to an exemplary implementation of an improved transmission procedure.

As already apparent from above, the improved transmission procedure also provides an improved UE. FIG. 12 illustrates a simplified and exemplary UE structure according to one exemplary solution of the improved transmission procedure, and which can be implemented based on the general UE structure explained in connection with FIG. 9. The various structural elements of the UE illustrated in said FIG. 12 can be interconnected between one another, e.g., with corresponding input/output nodes (not shown), e.g., in order to exchange control and user data and other signals. Although not shown for illustration purposes, the UE may include further structural elements.

As apparent from FIG. 12, the UE may include a channel status report transmitter, an uplink scheduling information receiver, updated channel status determination circuitry, adaptive-transmission-power-related determination circuitry, transmission power adaptation circuitry, and an uplink transmission transmitter.

In the present case as will become apparent from the below disclosure, the receiver of the UE can thus be exemplarily configured to at least partly perform one or more of receiving uplink scheduling information for an uplink transmission, receiving uplink resource information from the NTN entity indicating uplink resources usable by the UE to transmit the updated channel status report, receiving a downlink data transmission, receiving a NACK indication, etc.

In the present case as will become apparent from the below disclosure, the processing circuitry of the UE can thus be exemplarily configured to at least partly perform one or more of determining an updated channel status, determining whether and how to adapt a transmission power of the uplink transmission, determining whether or not to cancel the scheduled uplink transmission, determining whether or not to transmit a negative acknowledgment for a downlink data transmission, etc.

In the present case as will become apparent from the below disclosure, the transmitter of the UE can thus be exemplarily configured to at least partly perform one or more of transmitting a channel status report to the NTN entity, performing the uplink transmission of the uplink data using an adapted transmission power, transmitting the updated channel status report to another NTN entity etc.

One exemplary solution as will be disclosed in more detail further below is implemented by a UE that includes the following. A transmitter of the UE transmits a channel status report to a non-terrestrial network. NTN, entity, the channel status report providing information on a channel between the UE and the NTN entity. A processor of the UE determines an updated channel status of the channel between the UE and the NTN entity. A receiver of the UE receives, from the NTN entity, uplink scheduling information for an uplink transmission of uplink data from the UE to the NTN entity. The processor determines whether to adapt a transmission power of the uplink transmission of the uplink data, based on the updated channel status. The processor, when having determined to adapt the transmission power, adapts the transmission power. The transmitter performs the uplink transmission of the uplink data to the NTN entity according to the received uplink scheduling information and based on the adapted transmission power.

Figure 13:
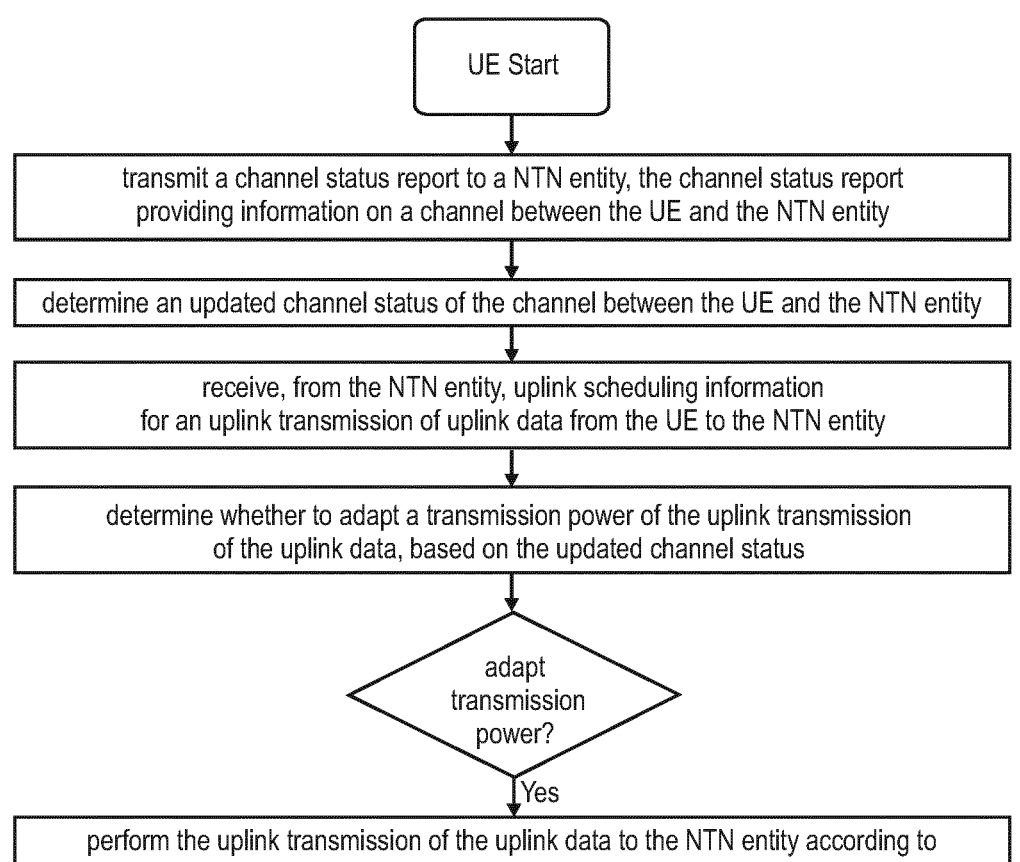
FIG. 13 is a flow diagram for the UE behavior, according to an exemplary implementation of the improved transmission procedure.

A corresponding sequence diagram for an exemplary UE behavior in line with the above-discussed UE is illustrated in FIG. 13. A corresponding method comprises the following steps performed by a UE:

transmitting a channel status report to a non-terrestrial network, NTN, entity, the channel status report providing information on a channel between the UE and the NTN entity, determining an updated channel status of the channel between the UE and the NTN entity, receiving, from the NTN entity, uplink scheduling information for an uplink transmission of uplink data from the UE to the NTN entity, determining whether to adapt a transmission power of the uplink transmission of the uplink data, based on the updated channel status, when having determined to adapt the transmission power, adapting the transmission power.

performing the uplink transmission of the uplink data to the NTN entity according to the received uplink scheduling information and based on the adapted transmission power.

Correspondingly, the improved UE participates in the improved transmission procedure so as to overcome the previously identified drawbacks for scenarios where the channel conditions vary a lot between the time instance the UE is scheduled by the base station and the time instance the data is transmitted from the UE to the NTN entity (e.g., satellite). In the present case, the UE takes the current channel status into account when performing the uplink transmission, rather than only relying on the transmission power as indicated by the uplink scheduling information, which was generated by the base station based on a previous channel status report that possibly indicates a significantly different channel status than currently the case. The inaccurate scheduling information, possibly caused by the large round-trip delay involved in such scenarios, can thus be compensated through the transmission power adaptation defined by the above solution.

For instance, the transmission power can be adapted (e.g., increased) by the UE so as to compensate for a deterioration of the channel quality compared to the channel quality that was indicated by the channel status report and on which basis the base station scheduled the uplink transmission. On the other hand, the transmission power could be decreased so as to avoid using excess transmission power in situations where the channel quality has improved compared to the channel quality that was indicated by the channel status report.

As already apparent from above, the improved transmission procedure also provides an improved base station. FIG. 14 illustrates a simplified and exemplary base station structure according to one exemplary solution of the improved transmission procedure, and which can be implemented based on the general base station structure explained in connection with FIG. 9. The various structural elements of the base station illustrated in said FIG. 14 can be interconnected between one another, e.g., with corresponding input/output nodes (not shown). e.g., in order to exchange control and user data and other signals. Although not shown for illustration purposes, the base station may include further structural elements.

As apparent from FIG. 14, the base station may include a channel status report receiver, uplink scheduling information preparation circuitry, and an uplink scheduling information transmitter.

In the present case as will become apparent from the below disclosure, the receiver of the base station can thus be exemplarily configured to at least partly perform one or more of receiving a channel status report, receiving a negative acknowledgment for a previously scheduled downlink transmission, etc.

In the present case as will become apparent from the below disclosure, the processing circuitry of the base station can thus be exemplarily configured to at least partly perform one or more of preparing a plurality of different uplink scheduling information, determining a pool of radio resources, determining whether or not to perform a retransmission of downlink data, etc.

In the present case as will become apparent from the below disclosure, the transmitter of the base station can thus be exemplarily configured to at least partly perform one or more of transmitting a plurality of different uplink scheduling information to the NTN entity, transmitting information on the determined pool of radio resources, transmitting configuration messages to the NTN entity or another NTN entity, transmitting downlink scheduling information and downlink data, etc.

One exemplary solution as will be disclosed in more detail further below is implemented by a base station that includes the following. A receiver of the base station receives a channel status report from a non-terrestrial network, NTN, entity providing information on a channel between a user equipment, UE, and the NTN entity. A processor of the base station prepares a plurality of different uplink scheduling information for transmission of uplink data by the UE based on the received channel status report, the different uplink scheduling information at least differing among each other in a value of transmission power. A transmitter of the base station transmits the prepared plurality of different uplink scheduling information to the NTN entity.

A corresponding sequence diagram for an exemplary base station behavior in line with the above-discussed base station is illustrated in FIG. 15. A corresponding method comprises the following steps performed by a base station:

receiving a channel status report from a non-terrestrial network, NTN, entity providing information on a channel between a user equipment, UE, and the NTN entity, preparing a plurality of different uplink scheduling information for transmission of uplink data by the UE based on the received channel status report, the different uplink scheduling information at least differing among each other in a value of transmission power, transmitting the prepared plurality of different uplink scheduling information to the NTN entity.

Correspondingly, the improved base station participates in the improved transmission procedure so as to overcome the previously identified drawbacks for scenarios where the channel conditions vary a lot between the time instance the UE is scheduled by the base station and the time instance the data is transmitted from the UE to the NTN entity (e.g., satellite). In the present case, the base station prepares multiple different uplink scheduling information that primarily differ between each other in the value of the transmission power that is to be used for the scheduled uplink transmission. By thus providing the opportunity of selecting among several uplink scheduling information for basically the same scheduled uplink transmission, the base station facilitates that the NTN entity selects that uplink scheduling information that has a suitable transmission power according to a current channel status determined at the satellite.

There are several different implementations of the above described NTN entity, UE, and base station, and how the three apparatus operate together in the improved transmission procedure.

In the following, different exemplary implementations of the improved transmission procedure will be described, respectively providing information on how the different entities interact with each other to achieve the advantages in connection with the improved transmission procedure.

For sake of presentation, the improved transmission procedure will be described separately with regard to a downlink transmission and an uplink transmission. Nonetheless, although uplink and downlink will be separately described below, the procedures and behavior of the participating apparatuses specifically relating to uplink or downlink can also be combined in such a manner that the improved transmission procedure not only separately covers uplink and downlink transmissions but is able to be applicable to both uplink and downlink transmissions.

On the other hand, other variants of the improved transmission procedure are applicable to both the downlink and uplink and will be separately described as well.

Improved Transmission Procedure in the Downlink

Different variants of the improved transmission procedure will be described in the following for the downlink scenario, according to which a downlink transmission of downlink data is scheduled by the gNB to be forwarded by the satellite to the UE.

An example of a general and simplified message exchange between the UE, satellite and gNB for an improved transmission procedure in the downlink is illustrated in FIG. 16. The satellite can be, e.g., the one as explained in connection with FIGS. 10 and 11.

As apparent therefrom, it is assumed that the UE is already connected to the satellite and the gNB. According to the first illustrated step, the UE transmits a channel status report to the satellite which is then forwarded to the gNB. The channel status report can be understood to provide information on the channel between the UE and the satellite, e.g., obtained by the UE from measurements performed on the channel.

This channel information can then be used by the gNB for scheduling the subsequent downlink transmission, e.g., by determining suitable scheduling parameters, such as one or more of transmission power, modulation order, coding rate, time-frequency radio resources, etc. Correspondingly, the gNB transmits downlink scheduling information as well as the downlink data to the satellite.

According to the improved downlink transmission procedure, before performing the actual downlink transmission scheduled by the gNB, the satellite will determine the current channel status, which may be different from the channel status as reflected in the channel status report that was forwarded previously to the gNB. For instance, the satellite may determine the updated channel status itself (e.g., by performing measurements on its own) or based on a further updated channel status report received from the UE. More details on possible variants relating to determining the updated channel status in the presently described improved downlink transmission procedure will be provided later.

The satellite will be able to determine whether to adapt the transmission power of the downlink transmission so as to take into account a possible difference between the updated channel status and the previous channel status as communicated to the gNB. Moreover, assuming that the satellite determines to adapt the transmission power of the downlink transmission, the satellite will also have to determine how much to adapt the transmission power.

This determination by the satellite of whether and how to adapt the transmission power will take the updated channel status into account, which is not only but particularly useful in those scenarios where a large round-trip delay exists with an increased possibility that the channel status on which the scheduling decisions by the gNB were based and the current channel status differed significantly.

Moreover, this determination by the satellite of whether and how to adapt the transmission power may also take further parameters into account. For instance, the satellite may take a minimum transmission-related parameter into account, which has to be fulfilled for the scheduled transmission. One example of such a minimum transmission-related parameter is a minimum SINR (Signal-to-Interference plus Noise Ratio). More details on possible variants relating to determining whether and how to adapt the transmission power in the presently described improved downlink transmission procedure will be provided later.

The satellite can thus determine to adapt or not adapt the transmission power of the scheduled downlink transmission, particularly taking the updated channel status into account. For instance, in a scenario where the channel status has significantly deteriorated, the scheduling parameters in the downlink scheduling information for the downlink data might not be suitable anymore. In order to compensate for this deterioration of the channel, the satellite may increase the transmission power, thereby increasing the likelihood that the downlink transmission is successfully received at the UE side. On the other hand, in a scenario where the channel status has significantly improved, the satellite may either not adapt the transmission power or may decrease the transmission power.

In addition or alternatively, the minimum transmission-related parameter may be taken into account for these decisions by the satellite. For instance, the satellite may determine whether the downlink transmission as scheduled by the gNB would fulfill the minimum transmission-related parameter, and in the negative case, would adapt (e.g., increase) the transmission power so as to meet what is required by the minimum transmission related parameter. Otherwise, no adaptation of the transmission power might be needed, or not possible so as to meet the minimum transmission-related parameter.

In the exemplary scenario of FIG. 16, it is assumed that the satellite decides for adapting the transmission power, and thus proceeds to transmit the downlink data with the adapted transmission power and also based on the scheduled transmission parameters of the received downlink scheduling information.

Different variants of the improved downlink transmission procedure presented in connection with FIG. 16 will be described in the following in connection with FIG. 17. FIG. 17 is an example of a general and simplified message exchange between the UE, satellite and gNB for an improved transmission procedure in the downlink, which combines different variants to be explained in the following.

According to one exemplary variant, the satellite can perform an estimation as to whether or not the scheduled downlink transmission of the downlink data will likely be successful. This estimation can be based on the updated channel status determined before. For instance, the satellite learns that the channel conditions have deteriorated substantially compared to the instance where the channel status report was forwarded to the gNB for the downlink data scheduling, in which case the scheduled downlink transmission would fail with a high probability. Further optionally, the satellite may also take into account how much of the channel deterioration can be compensated by increasing the transmission power as explained above, and also whether the minimum transmission-related parameter requirement would be met, even including the transmission power increase.

In case the satellite estimates that the scheduled downlink transmission will not be successful, the satellite can transmit a negative acknowledgment for the scheduled downlink transmission to the gNB, already at this early point of time where the downlink transmission has not even been performed. Correspondingly, the negative acknowledgment can be exemplarily called an early NACK.

As a further optional implementation of this variant, the satellite can determine whether or not to cancel the scheduled downlink transmission of the downlink data to the UE depending on the previous estimation. For instance, the estimation by the satellite can provide the information that the downlink transmission is highly unlikely to be successful, in which case the satellite can simply decide to cancel the scheduled downlink transmission, such that the scheduled downlink transmission is not performed and the transmission of the early NACK is performed.

On the other hand, the estimation by the satellite can yield the result that the scheduled downlink transmission might not be likely successful, but that attempting the scheduled downlink transmission is still worthwhile, in which case the satellite will proceed to perform the scheduled downlink transmission (possibly with the adapted transmission power). The satellite can decide to transmit the early NACK to the gNB in order to accelerate a likely downlink data re-transmission. On the other hand, the satellite can decide to not transmit the early NACK but rather await the transmission feedback from the UE regarding the performed downlink transmission.

A further exemplary improvement relates to the case where the satellite transmits the early NACK while still attempting to perform the downlink transmission. According to this exemplary improvement, the UE can be informed about the early NACK transmitted by the satellite to the gNB with regard to the downlink transmission. The UE thus receives a downlink transmission as well as a NACK indication, deriving therefrom that the satellite already transmitted a NACK to the gNB for the just received downlink transmission. Thus, the UE, even if decoding the received downlink transmission is not successful, would not transmit a further NACK to the satellite, knowing that an early NACK was already provided to the gNB that would trigger a retransmission of the failed downlink transmission.

On the other hand, according to one example, in case the UE succeeds in decoding the received downlink transmission, an ACK may be transmitted to the satellite, so as to avoid a further downlink transmission. The satellite, even when receiving the rescheduled downlink scheduling information and the same downlink data, would not perform the downlink transmission.

One or more suitable thresholds for the likelihood of a successful downlink transmission could be configured in the satellite in connection with determining whether or not the scheduled downlink transmission will be successful or not and also in connection with determining whether or not to cancel the scheduled downlink transmission.

According to particular exemplary implementation of this variant, the estimation of whether or not the scheduled downlink transmission will be successful can also take into account whether the UE is in or out of coverage of the satellite. For instance in case the satellite learns that the UE has moved out of coverage, the satellite may cancel the scheduled downlink transmission and may instead forward the downlink data to another satellite, which is the target of the handover that the UE will or is currently performing.

An exemplary implementation of this variant is illustrated in FIG. 17. As apparent therefrom, the satellite after determining the updated channel status (here exemplarily based on a previously received updated channel status report), also determines whether or not to cancel the scheduled downlink transmission. In this particular instance, it is assumed that the satellite indeed determines to cancel the downlink transmission and provides an early NACK to the gNB. According to a further optional implementation, the satellite also provides the updated channel status report to the gNB in order to provide updated channel status information to the gNB to improve the re-scheduling of the downlink data transmission.

Depending on the implementation, the early NACK transmitted by the satellite would indicate that the downlink transmission as previously scheduled by the gNB was canceled and was in fact not performed by the satellite. Correspondingly, the gNB realizes on that basis that the rescheduling is to be performed as if it was the first transmission of the downlink data rather than a retransmission, because the UE did not receive anything from the first scheduled downlink transmission attempt. For instance, the gNB would transmit the same redundancy version of the downlink data as for the first case, rather than another redundancy version of the downlink data.

As a further example, the downlink scheduling information for the downlink data will also be generated such that it indicates that the transmitted downlink data is new downlink data as if it was the first transmission of the downlink data and not a re-transmission. In one exemplary implementation, the new-data indicator of the scheduling information could be toggled to achieve this.

The gNB again schedules a downlink transmission of the same DL data, and will determine different scheduling parameters based on the updated channel status. The gNB then transmits the downlink scheduling information and the downlink data to the satellite.

The satellite in turn can then perform similar steps as done for the first downlink transmission attempt, including determining an updated channel status, determining whether or not to cancel the downlink transmission, as well as determining whether and how to adapt the downlink transmission power. In the exemplary scenario of FIG. 17, it is assumed that in the second attempt the satellite determines to perform the downlink transmission with an adapted transmit power.

As discussed above, the satellite may decide to proceed to perform the scheduled downlink transmission even though it is unlikely that it will be successful but also transmits an early NACK to the gNB (not illustrated in FIG. 17). In that case, in contrast to what was described above in connection with FIG. 17, the early NACK indeed triggers a normal re-transmission of the downlink data (e.g., another redundancy version of the downlink data so as to achieve a combining gain at the UE) rather than triggering a first transmission of the same downlink data as before. Correspondingly, the gNB, e.g., based on an updated channel status report received from the satellite, may schedule the downlink retransmission of the downlink data, providing corresponding downlink scheduling information and the downlink data to the satellite so as to be further forwarded to the UE.

In any case, by using an early NACK feedback from the satellite it is possible that the gNB re-schedules the downlink data taking the updated channel status into account so as to achieve a more robust transmission (e.g., using a lower coding rate and/or a lower modulation order and/or higher level of aggregations or repetition R) and retransmits the downlink data to the satellite.

Overall, the cancellation of the scheduled downlink transmission can save transmission power, which could theoretically also be allocated to the transmission of downlink data to other Ues. Furthermore, transmission of the early NACK from the satellite to the gNB triggers a data (re-) transmission faster.

FIG. 18 illustrates conceptually the result of the transmission power adaptation according to the above described improved downlink transmission procedure. In particular. FIG. 18 illustrates different amounts of transmission power distributed exemplarily among three Ues, UE1, UE2, UE3, at different time instances. At time instance t1. FIG. 18 illustrates the transmission power allocated by the satellite in accordance with how the downlink transmissions are scheduled for each of the downlink transmissions. On the other hand, at time instance t2 the transmission power for UE1 is increased to compensate for a deterioration in the channel status, while maintaining the transmission power as scheduled for the downlink transmissions towards UE2 and UE3. Moreover, at time instance t3, it is assumed that the downlink data transmission to UE1 is being canceled by the satellite (e.g., due to a significant drop in the channel quality) such that the unused transmission power scheduled for UE1 (or only part of it) can be reallocated for the downlink data transmission towards UE2 and UE3.

According to a further exemplary variant, which can but need not be combined with the other described variants, the priority of the downlink data will be taken into account by the satellite, e.g., with regard to whether and how much to adapt the transmission power of the downlink transmission. For instance, the satellite can determine higher transmission power for a downlink transmission of high-priority data compared to the downlink transmission of low- or regular-priority data. Consequently, high-priority data can be transmitted by the satellite to the UE achieving a higher transmission robustness.

According to one example, information on the priority of the downlink data can be provided by the gNB to the satellite, e.g., included with the DL data or included with the downlink scheduling information transmitted together with and regarding the DL data (see FIG. 17).

Still alternatively, the satellite may be aware of the priority of the DL data, without being explicitly provided by the gNB with such priority information.

According to a further exemplary variant, which can but need not be combined with other described variants, the satellite takes negative acknowledgements (NACKs) and/or positive acknowledgments (ACKs) (e.g., of the HARQ function) transmitted for previous downlink transmission into account for the determination of whether and how to adapt the downlink transmission power. In more detail, NACKs/ACKs can be monitored by the satellite as being an indication of the channel status of the channel between the satellite and the UE. For instance, when the number of NACKs received for previously transmitted downlink transmission is larger than a previously configured NACK threshold, this is taken as indication that the channel status is bad and may lead to a further increase in transmission power to be used in the downlink.

According to a further option, also the negative and/or positive acknowledgments (NACKs/ACKs) sent in connection with an uplink transmission are monitored by the satellite and taking into account for the determination of whether and how to adapt the downlink transmission power.

Also the point in time when the ACKs/NACKs for the uplink or downlink transmissions are received is taken into account, e.g., giving recent ACK/NACKs more weight than older ACK/NACKs.

Improved Transmission Procedure in the Uplink

Different variants of the improved transmission procedure will be described in the following for the uplink scenario, according to which an uplink transmission of uplink data is scheduled by the gNB to be performed by the UE towards the satellite.

The underlying principle is that the transmission power for the uplink transmission is adapted based on the most current updated channel status, rather than only relying on the transmission power as indicated by the corresponding uplink scheduling information generated by the gNB. The adaptation of the uplink transmission power can occur at the satellite side (see below first variant) or at the UE side (see below second variant), both cases being described separately in the following.

Figure 19:
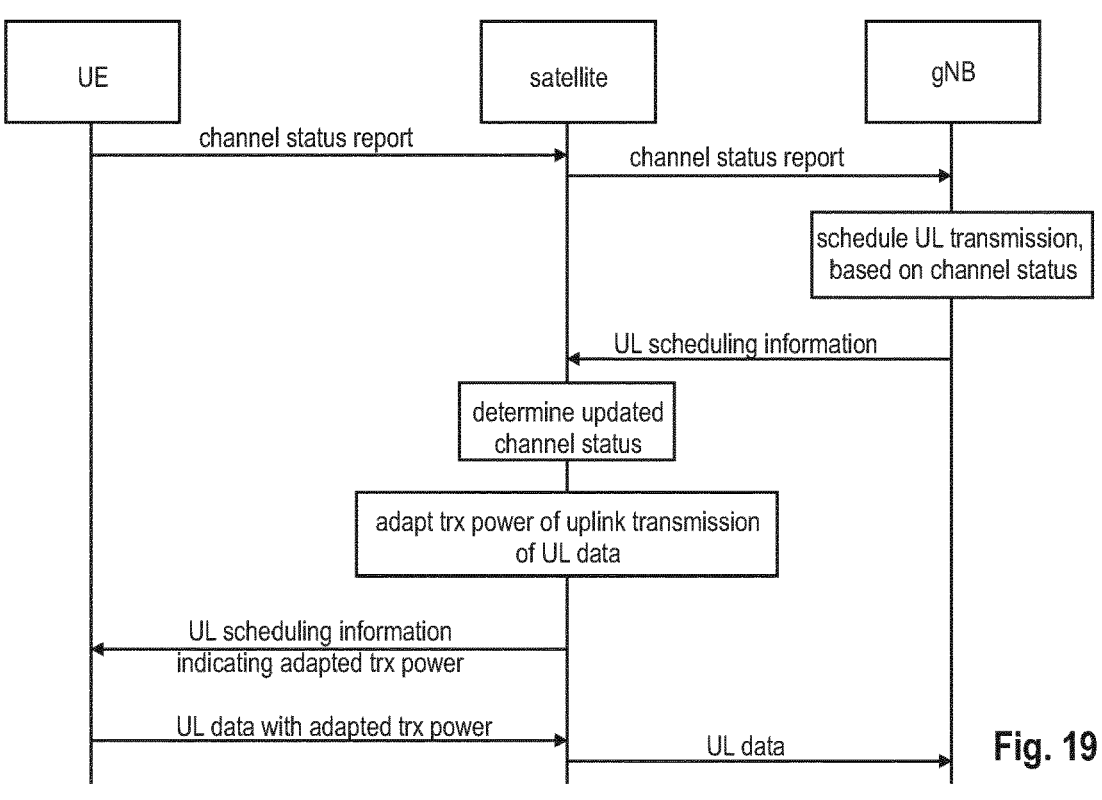
FIG. 19 illustrates a general and simplified message exchange between the UE, satellite and gNB, for an improved transmission procedure in the uplink, according to a first variant.

According to the first variant, the adaptation of the uplink transmission power is performed primarily by the satellite, and FIG. 19 illustrates an example of a general and simplified message exchange between the UE, satellite and gNB according to this first variant.

In compliance with the assumptions made for the downlink transmission procedure discussed above, it is assumed that the UE is already connected to the satellite and the gNB. According to the first illustrated step, the UE transmits a channel status report to the satellite, which is then forwarded to the gNB. The channel status report can be understood to provide information on the channel between the UE and the satellite, e.g., obtained by the UE from measurements performed on the channel.

This channel information can then be used by the gNB for scheduling the subsequent uplink transmission, e.g., by determining suitable scheduling parameters, such as one or more of transmission power, modulation order, coding rate, time-frequency radio resources, etc. Correspondingly, the gNB transmits uplink scheduling information to the satellite.

The improved uplink transmission procedure is quite similar in many aspects to the above described improved downlink transmission procedure, for instance with regard to the determination of the updated channel status, and the determination of whether and how to adapt the transmission power. The main differences result from that the satellite, in the downlink scenario, can directly adapt the transmission power that will be used by itself for performing the downlink transmission, while in the uplink scenario the satellite will have to provide a suitable instruction for the UE to perform the uplink transmission based on the adapted uplink transmission power.

In line with the above, before scheduling the uplink transmission for the UE, the satellite will determine the current channel status, which may be different from the channel status as reflected in the channel status report that was forwarded previously to the gNB. For instance, the satellite may determine the updated channel status itself (e.g., by performing measurements on its own) or based on a further updated channel status report received from the UE.

The satellite will be able to determine whether to adapt the transmission power of the uplink transmission so as to take into account a possible difference between the updated channel status and the previous channel status as communicated to the gNB. Moreover, assuming that the satellite determines to adapt the transmission power of the uplink transmission, the satellite will also have to determine how much to adapt the transmission power. This determination by the satellite of whether and how to adapt the transmission power will take the updated channel status into account.

Similar to the improved downlink transmission procedure (reference is made to the above sections), this determination by the satellite of whether and how to adapt the transmission power may also take further parameters into account, such as the minimum transmission-related parameter.

Consequently, the satellite is able to determine whether or not adaptation of the transmission power for the uplink transmission is indeed needed, and if adaptation of the transmission power is needed, what suitable transmission power value should be instructed to the UE.

In the exemplary scenario of FIG. 19, it is assumed that the satellite decides for adapting the transmission power of the uplink transmission, and thus proceeds to transmit a corresponding uplink scheduling information to the UE, which indicates such an adapted transmission power.

In turn, the UE will perform the uplink transmission in line with the received uplink scheduling information, thus using the adapted transmission power as instructed by the uplink scheduling information provided by the satellite.

In the above solution of the first variant explained in connection with FIG. 19, it was generally assumed that the satellite provides a corresponding uplink scheduling information indicating the adapted transmission power to the UE. In the following, two different exemplary implementations will be presented on how the satellite can achieve this.

Figure 20:
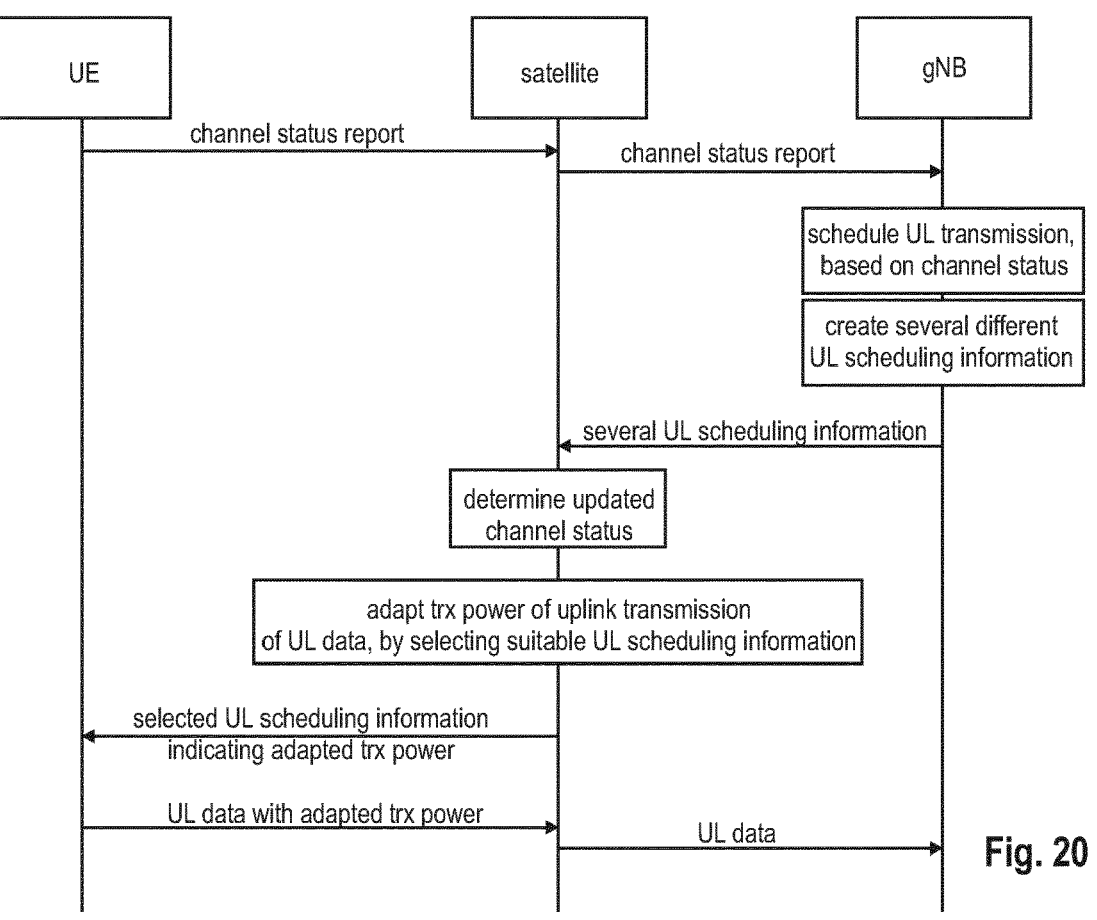
FIG. 20 illustrates a general and simplified message exchange between the UE, satellite and gNB according to a first implementation of the first variant.

According to a first implementation of this first variant, several different uplink scheduling information are provided by the gNB, differing at least in the indicated transmission power. The gNB can be, e.g., the one as explained in connection with FIGS. 14 and 15. FIG. 20 illustrates an example of a general and simplified message exchange between the UE, satellite and gNB according to this first implementation of the first variant.

As apparent therefrom, it is initially assumed that the channel status report is generated and transmitted by the UE to the satellite, which in turn forwards this channel status report to the gNB, e.g., for scheduling purposes. The gNB prepares the multiple uplink scheduling information for the transmission of the uplink data by the UE, based on the received channel status report.

For instance, the gNB might schedule the uplink transmission with an "optimal" transmission power value according to the channel status as indicated in the channel status report. However, the gNB might generate different uplink scheduling information each containing different transmission power values (e.g., transmission power commands, TPCs that correspond to different transmission power values), assuming different (deteriorated or improved) channel status The generated uplink scheduling information can furthermore differ from one another not only with regard to the indicated transmission power but also according to other parameters, such as the modulation order or the coding rate.

As apparent from FIG. 20, the gNB then transmits the generated plurality of uplink scheduling information to the satellite. The satellite will then determine, based on the updated channel status (e.g., updated based on its own measurements), which one of the transmission power values encoded into the different uplink scheduling information is the most suitable one for performing the uplink transmission by the UE at that point in time. The satellite then selects that uplink scheduling information among the various uplink scheduling information that has the most suitable transmission power value. The selection by the satellite can be based on the current channel status. Correspondingly, the satellite is enabled to adapt the transmission power based on the updated channel status by selecting the suitable uplink scheduling information previously prepared by the gNB.

The thus selected uplink scheduling information is then transmitted to the UE. Correspondingly, the UE will perform the uplink transmission as scheduled by the received uplink scheduling information, including using a transmission power for the uplink transmission in accordance with the transmission power value selected by the satellite.

According to a second implementation of the first variant, the satellite, instead of selecting the suitable uplink scheduling information among the plurality of available uplink scheduling information, adapts the uplink transmission power by directly changing a corresponding transmission power parameter (e.g., a transmission power control field corresponding to the transmission power parameter) in a single-provided uplink scheduling information to be forwarded to the UE. Differently from what was described above in connection with FIG. 20, the gNB does not generate a plurality of different uplink scheduling information, but rather prepares a single uplink scheduling information and forwards same to the satellite. This single uplink scheduling information indicates a particular transmission power value to be used in the context of the scheduled uplink transmission (e.g., determined based on the channel status as indicated by a previously received channel status report).

As explained above as well, the satellite will determine, based on the updated channel status, a suitable transmission power value to be used for the uplink transmission and to be included in the uplink scheduling information. Subsequently, the satellite will create a corresponding uplink scheduling information based on the determined suitable uplink transmission power value as well as based on the previously received uplink scheduling information. For instance, the satellite may proceed to only change the transmission-power-related value of the received uplink scheduling information to reflect the transmission power value as determined based on the updated channel status. The satellite then proceeds to transmit the thus adapted uplink scheduling information to the UE.

Correspondingly, the UE will perform the uplink transmission as scheduled by the received uplink scheduling information, including using a transmission power for the uplink transmission in accordance with the transmission power value adapted by the satellite.

Different variants of the improved uplink transmission procedure of this first variant presented in connection with FIGS. 19 and 20 will be described in the following. According to one exemplary adaptation (not illustrated in any of the figures), an early success-estimation and possible cancelation of the uplink transmission can be performed, in a manner that corresponds to the downlink transmission as explained in connection with FIG. 17. To said end, the satellite can perform an estimation as to whether or not the scheduled uplink transmission of the uplink data by the UE will likely be successful. Accordingly, the satellite can determine a current channel status, as explained before (e.g., see FIG. 17), and based thereon, may learn that the channel conditions have deteriorated substantially compared to the instance where the channel status report was forwarded to the gNB for the uplink data scheduling. The satellite could thus conclude that the scheduled uplink transmission would fail with a high probability. Further optionally, the satellite may also take into account how much of the channel deterioration can be compensated by increasing the transmission power as explained above, also optionally taking into account a minimum transmission-related parameter.

In case the satellite estimates that the scheduled uplink transmission will not be successful, the satellite can transmit a negative acknowledgment for the scheduled uplink transmission to the gNB, already at this early point of time where the uplink transmission has not even been performed. Correspondingly, the negative acknowledgment can be exemplarily called an early NACK.

As a further optional implementation, the satellite can determine whether or not to cancel the scheduled uplink transmission of the uplink data depending on the previous estimation. For instance, the estimation by the satellite can provide the information that the uplink transmission is highly unlikely to be successful, in which case the satellite can simply decide to cancel the scheduled uplink transmission, by not transmitting the uplink scheduling information to the UE. In that case, the satellite could transmit a NACK to the gNB to trigger a re-scheduling of the uplink transmission (possibly together with information on the updated channel status to improve the re-scheduling).

The gNB re-schedules the uplink transmission, in response to the received early NACK, and, if available, takes the most updated channel status information into account. The gNB learns from the early NACK that the uplink transmission was canceled and not even performed by the UE. Correspondingly, the gNB realizes on that basis that the rescheduling is to be performed as if it was the first transmission of the uplink data rather than a retransmission, because the UE did not transmit anything.

The uplink scheduling information for the uplink data will also be generated such that it indicates that the scheduling is for new uplink data as if it was the first transmission and not a re-transmission.

The gNB again schedules an uplink transmission, and will determine different scheduling parameters based on the updated channel status. The gNB then transmits the uplink scheduling information to the satellite. In turn, the satellite could. e.g., perform the same operation as done for the first uplink transmission attempt.

On the other hand, the estimation by the satellite can yield the result that the scheduled uplink transmission might not be likely successful, but that attempting the scheduled uplink transmission is still worthwhile, in which case the satellite will proceed to transmit the uplink scheduling information to the UE (possibly where the uplink scheduling information has an adapted transmission power). The satellite can decide to transmit the early NACK to the gNB in order to accelerate a likely re-scheduling of the uplink. On the other hand, the satellite can decide to not transmit the early NACK but rather await the uplink transmission from the UE to be forwarded to the gNB.

As explained already in connection with the success-estimation and cancelation of the downlink transmission, the UE can use suitable thresholds for the likelihood of a successful uplink transmission and also for the decision of whether or not to cancel the scheduled uplink transmission (e.g., also taking into according whether the UE is in coverage or out of coverage of the satellite).

In any case, by using an early NACK feedback from the satellite it is possible that the gNB re-schedules the uplink data taking the updated channel status into account so as to achieve a more robust transmission (e.g., using a lower coding rate and/or a lower modulation order and/or higher level of aggregations or repetition R). Further, the cancellation of the scheduled uplink transmission can save transmission power. Furthermore, transmission of the early NACK from the satellite to the gNB triggers a data (re-) transmission faster.

Figure 21:
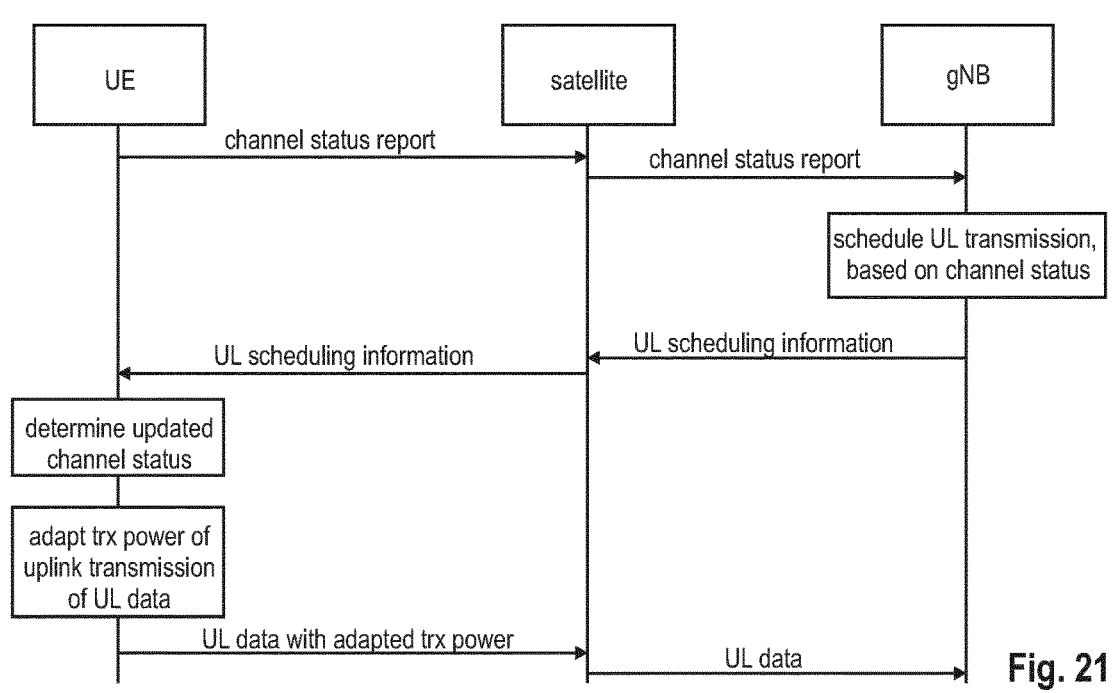
FIG. 21 illustrates a general and simplified message exchange between the UE, satellite and gNB, for an improved transmission procedure in the uplink, according to a second variant.

According to the second variant, the adaptation of the uplink transmission power occurs at the UE side (rather than by the satellite). FIG. 21 illustrates an example of a general and simplified message exchange between the UE, satellite and gNB according to this second variant. The UE in connection with this second variant can be, e.g., the one explained in connection with FIGS. 12 and 13.

Similar exemplary assumptions can be made as before for the solution that was explained above with reference to FIG. 19. The first steps can be similar or the same, e.g., including the steps regarding the transmission of the channel status report by the UE, regarding how the gNB receives the channel status report and generates a suitable uplink scheduling information and transmits same to the satellite.

Differently, however, in this second variant, because the satellite does not adapt the transmission power, the satellite simply forwards the received uplink scheduling information to the UE.

At the UE side, however, the UE when receiving the UL scheduling information and preparing the uplink transmission of the uplink data, also determines an updated channel status of the channel between the UE and the satellite. As exemplarily assumed already before, the channel status can be determined by the UE, e.g., based on measurements of reference signals received from the satellite, such as the RS or DMRS (Demodulation Reference Signals) signals in the downlink. The updated channel status could be different from the channel status as reflected in the channel status report that was forwarded previously to the gNB, e.g., better or worse.

Based on the updated channel status, the UE will determines whether and how to adapt the transmission power of the uplink transmission, e.g., taking into account these possible differences between the updated channel status and the previous channel status as communicated to the gNB in the channel status report. In case the UE decides to adapt the uplink transmission power to compensate for a channel status difference, the UE will also have to determine how much to adapt the transmission power. This determination by the UE of whether and how to adapt the transmission power will take the updated channel status into account.

Similar to the improved downlink transmission procedure (reference is made to the above sections), this determination by the UE of whether and how to adapt the transmission power may also take further parameters into account, such as the minimum transmission-related parameter (e.g., minimum SINR). For instance, the UE may try to adapt its transmission power to meet this minimum SINR. For instance in case the minimum SINR cannot be met, even when using the highest possible transmission power, the UE may decide to cancel the uplink transmission (see later).

Consequently, the UE is able to determine whether or not adaptation of the transmission power for the uplink transmission is indeed needed, and if adaptation of the transmission power is needed, what suitable uplink transmission power value should be used.

The UE then performs the uplink transmission using the adapted transmission power, the uplink data being then forwarded by the satellite further towards the gNB.

Different adaptations of the improved uplink transmission procedure presented for the second variant in connection with FIG. 21 will be described in the following.

According to one exemplary adaptation (illustrated in FIG. 22), an early success-estimation and possible cancelation of the uplink transmission can be performed, in a corresponding manner to the downlink transmission as explained in connection with FIG. 17 and the solution explained for the solution where the satellite performs the early success-estimation and the possible cancelation of the uplink transmission.

Figure 22:
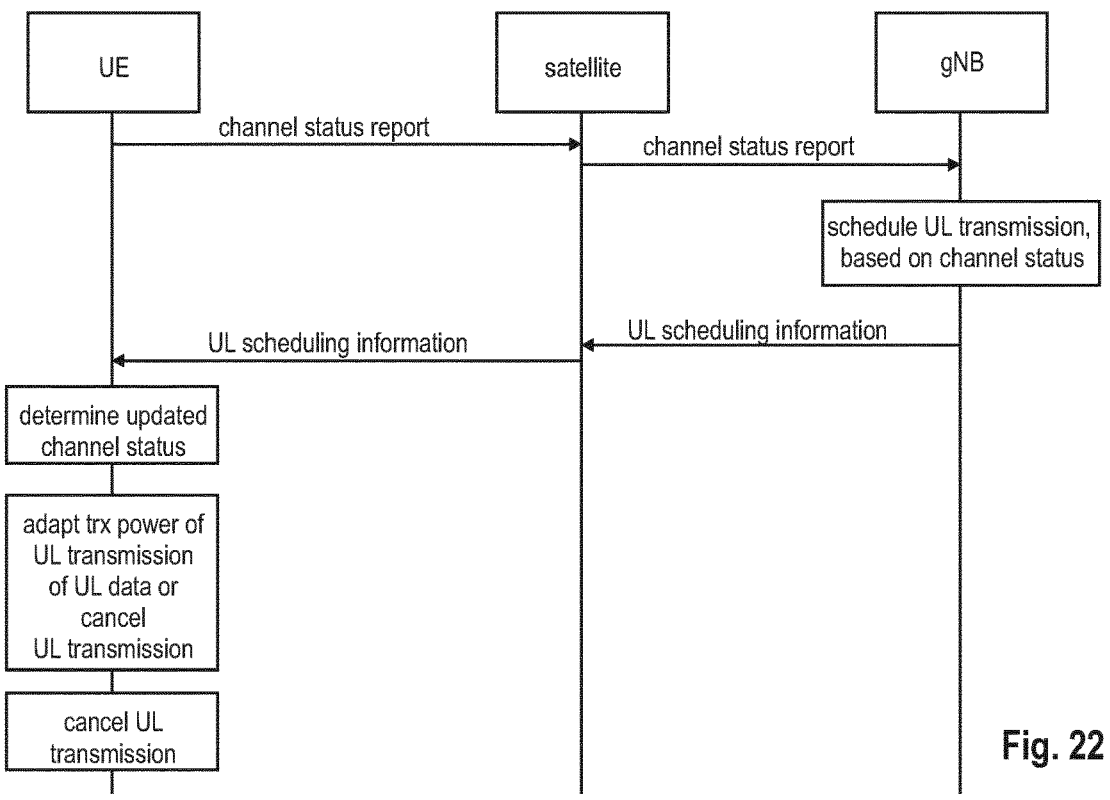
FIG. 22 illustrates a general and simplified message exchange between the UE, satellite and gNB according to an implementation of the second variant.

As apparent from FIG. 22, the UE can additionally decide whether it performs the uplink transmission with the adapted transmission power or whether it cancels the uplink transmission due to the very low likelihood of success. This may involve that the UE performs an estimation as to whether or not the scheduled uplink transmission of the uplink data by the UE will likely be successful, e.g., based on the previously determined updated channel status.

In case the UE determines that the uplink transmission will not be successful (as illustrated in FIG. 22), the UE could also decide to cancel the scheduled uplink transmission, e.g., when the success likelihood is very low. The UE thus does not perform the uplink transmission, but instead may, e.g., send an early NACK indicating the uplink scheduling information was successfully received while the transmission by the UE was skipped.

The satellite determines that despite being scheduled for an uplink transmission the UE does not perform the uplink transmission, and thus determines that the UE canceled the uplink transmission. In one example, the satellite can request the gNB to reschedule the UE for an uplink transmission.

On the other hand, the estimation by the UE results in that the scheduled uplink transmission might not be likely successful, but that attempting the scheduled uplink transmission is still worthwhile, in which case the UE still performs the uplink transmission to the satellite.

In both the first and second variants discussed above (i.e., adapting uplink transmission power by satellite and the UE), an optional adaptation provides that the priority of the uplink data can equally be taken into account when determining whether and how to adapt the uplink transmission power. The UE is well aware of the priority of the uplink data, it wants to transmit. Furthermore, for the first variant where the satellite performs the determination, the satellite can be made aware of the priority of the uplink data, e.g., based on a scheduling request or buffer status report transmitted by the UE that indicates the presence or amount of data in the UE uplink buffers available for transmission as well as information on the priority of the uplink data.

For instance, a higher transmission power can be determined for an uplink transmission of high-priority data, while using a relatively-lower transmission power for an uplink transmission of low- or regular-priority data. Consequently, high-priority data can be transmitted by the UE achieving a higher transmission robustness.

General Variants Applicable to Both the Improved Downlink and Uplink Transmission Procedures In the following, different variants will be presented regarding specific aspects already introduced above for the improved transmission procedure for the uplink/downlink. Put differently, the following variants can be applicable to both the improved downlink transmission procedure (see, e.g., the above description in connection with FIG. 16-18) and the improved uplink transmission procedure (see, e.g., the above description in connection with FIG. 19-22).

A first variant is applicable to those solutions discussed herein where the UE transmits the updated channel status report to the satellite. In those solutions it was simply assumed that the UE provides an updated channel status report to the satellite, without however providing details as to how the UE can achieve this.

Conceptually, the updated channel status report can but need not be different from the regular channel status report, which the UEs transmits to the satellite. The regular channel status report can be, e.g., configured to be transmitted on a periodic basis. i.e., every x ms. In addition or alternatively, the regular channel status report can be aperiodic. e.g., triggered by an event occurring at the UE (e.g., a measurement event) or explicitly requested by the satellite or gNB.

As will be explained in the following, the updated channel status report can differ from the regular channel status report, based on one or more of the following:

different triggering, e.g., different periodicity, different events (e.g., measurement events), different instruction different time/frequency resources. e.g., different PRBs different transmission parameters, such as modulation scheme, coding rate different content According to one exemplary solution of this variant, the UE might be configured differently on how and when to transmit the updated channel status report compared to how and when to transmit the regular channel status report. This includes that the UE determines whether and when to transmit an updated channel status report to the satellite indicating the updated channel status. For instance, the gNB or satellite can configure the UE to transmit the updated channel report with a higher periodicity to the satellite, in order to keep the satellite up to date on the channel status. Another example would be based on one or more conditions that have to be fulfilled for the UE to transmit the updated channel status report, for instance where the updated channel status report is transmitted when the UE measures a particular drop in channel quality (e.g., compared to the channel status as reported in the previous regular channel status report). According to another example, such a condition would be that the UE leaves the coverage area of the satellite. Such a solution is particularly advantageous for the satellite to learn about the deteriorated channel status, while keeping the additional overhead caused by the updated channel status report low.

According to one exemplary solution of this variant, the gNB may allocate dedicated radio resources for the UE to transmit these updated channel status reports, and the satellite informs the UE about these dedicated radio resources. The UE then can use these dedicated radio resources to transmit the updated channel status report to the satellite. The dedicated radio resources can, e.g., indicate particular time and/or frequency radio resources to be used by the UE.

According to another example, the gNB defines a pool of radio resources (e.g., time and/or frequency) and transmits this resource pool information to the satellite. Then, the satellite can determine from among the radio resources in the pool, which radio resources should be allocated to the UE for the transmission of the updated channel status report. These selected uplink radio resources are then informed to the UE.

As a result, the UE can use different radio resources for transmitting the updated channel status report than for transmitting the regular channel status report.

According to another exemplary solution, the UE can use transmission parameters for transmitting the updated channel status report that are different from the transmission parameters that are used for transmitting the regular channel status report. For instance, the specific transmission parameters for the updated channel status report could be such that they ensure a more robust transmission, e.g., a lower-order modulation scheme or a lower coding rate. Moreover, the transmission parameters may be selected such that the decoding process at the satellite side is made easier.

According to still another exemplary solution, the updated channel status report might have a different content than the regular channel status report. For instance, the updated channel status report can include one or more of the following: SINR, CSI, CQI, SRS, location, direction of movement, and the speed of the UE.

One exemplary implementation of the updated channel status report greatly simplifies the content as well as the transmission of same. For instance, the updated channel status report merely serves to provide an indication of whether or not the channel status has deteriorated compared to the channel status indicated by the previously transmitted regular channel status report. Such a simple indication could for instance be transmitted by the UE such that the receiver of the satellite is able to detect the presence of such an updated channel status report transmission solely based on energy detection. The transmission by the UE would, e.g., not use any modulation or coding. Correspondingly, the satellite monitors previously-agreed radio resources, for such a spike in transmission power, and in case the satellite detects a certain transmission energy at those radio resources, the satellite determines that the updated channel status report is transmitted by the UE and derives therefrom that the channel status has significantly deteriorated.

According to another variant, which can also but need not be used in combination with other described variants, the updated channel status report need not to be forwarded further to the gNB, differently from how the satellite handles the regular channel status report. As explained in some of the solutions above, the content of the updated channel status report is exclusively used at the satellite side, in which case the updated channel status report need not be forwarded to the gNB. On the other hand, other solutions described above benefit from having information on the updated channel status (e.g., when rescheduling a downlink or uplink transmission) and thus would benefit from a solution according to which the satellite forwards the updated channel status report to the gNB or at least provides the suitable information to the gNB in other form. Such a behavior of the satellite can be, e.g., configured by the gNB.

Another variant, which can also but need not be used in combination with other described variants, relates to those solutions discussed herein where the satellite determines an updated channel status, e.g., in the context of determining of whether or not to adapt that uplink/downlink transmission power. As already hinted at before (see, e.g., FIG. 17), the satellite may be, e.g., provided by the UE with an updated channel status report, indicating the updated channel status. In addition or alternatively, the satellite may perform measurements or determinations on its own so as to derive the current channel status. In one option, the satellite may also take information on the location of the UE into account.

According to still another variant, which can also but need not be used in combination with other described variants, dedicated radio resources can be assigned to the transmission of downlink reference signals that the UE can use to determine the updated channel status. For instance, the UE may use a downlink reference signals (such as DMRS) to determine the current channel status. According to this variant, the corresponding downlink reference signals, to be used by the UE for said determination, can be transmitted in the downlink at particular radio resources (known to the UE). These dedicated radio resources can be for instance determined by the gNB and assigned to the satellite. According to another exemplary option, the gNB can define a pool of radio resources and inform the satellite accordingly on said resource pool. The satellite can then select radio resources from the resource pool, and use them to transmit the downlink reference signal to be used by the UE for determining the updated channel status. The UE can be, e.g., informed about the selected radio resources such that it is able to use them for the channel status determination.

Another variant, which can also but need not be used in combination with other described variants, deals with the case where the serving satellite of the UE is not capable of decoding the updated status reports itself. Consequently, such as satellite may not be able to determine an updated channel status required for performing the improved transmission procedure. The capabilities of different satellites may vary a lot including the capability of decoding regular or updated channel status reports. This improvement variant provides a solution to such scenarios by using the capability of a neighboring satellite so as to decode the updated channel status report and provide suitable information to the serving satellite.

Generally, the variant relies on that a neighbor satellite with the suitable capability receives the updated channel status report, decodes same and provides the serving satellite with suitable information on the updated channel status.

Different implementations are possible as to how the neighboring satellite receives the updated channel status report. According to one exemplary implementation, the neighbor satellite can monitor the transmissions of the updated channel status reports transmitted by the UE to its serving satellite. In order to facilitate the monitoring by the neighbor satellite, information on the radio resources used by the UE to transmit the updated channel status report to the serving satellite can be provided to the neighbor satellite (e.g., from the serving satellite or from the gNB). Correspondingly, the neighbor satellite may only need to monitor the instructed radio resources for the updated channel status report.

According to another exemplary implementation, the UE can be connected simultaneously to two satellites (similar to dual connectivity), to its primary (serving) satellite as well as to this neighbor satellite with the superior capability. According to this exemplary implementation, the UE would transmit the updated channel status report to the secondary (neighbor) satellite where the updated channel status report provides information on the status of the channel between the UE and the primary, serving, satellite. Also in said case, the secondary (neighbor) satellite decodes the updated channel status report and provides the decoded information to the primary (serving) satellite.

Figure 23:
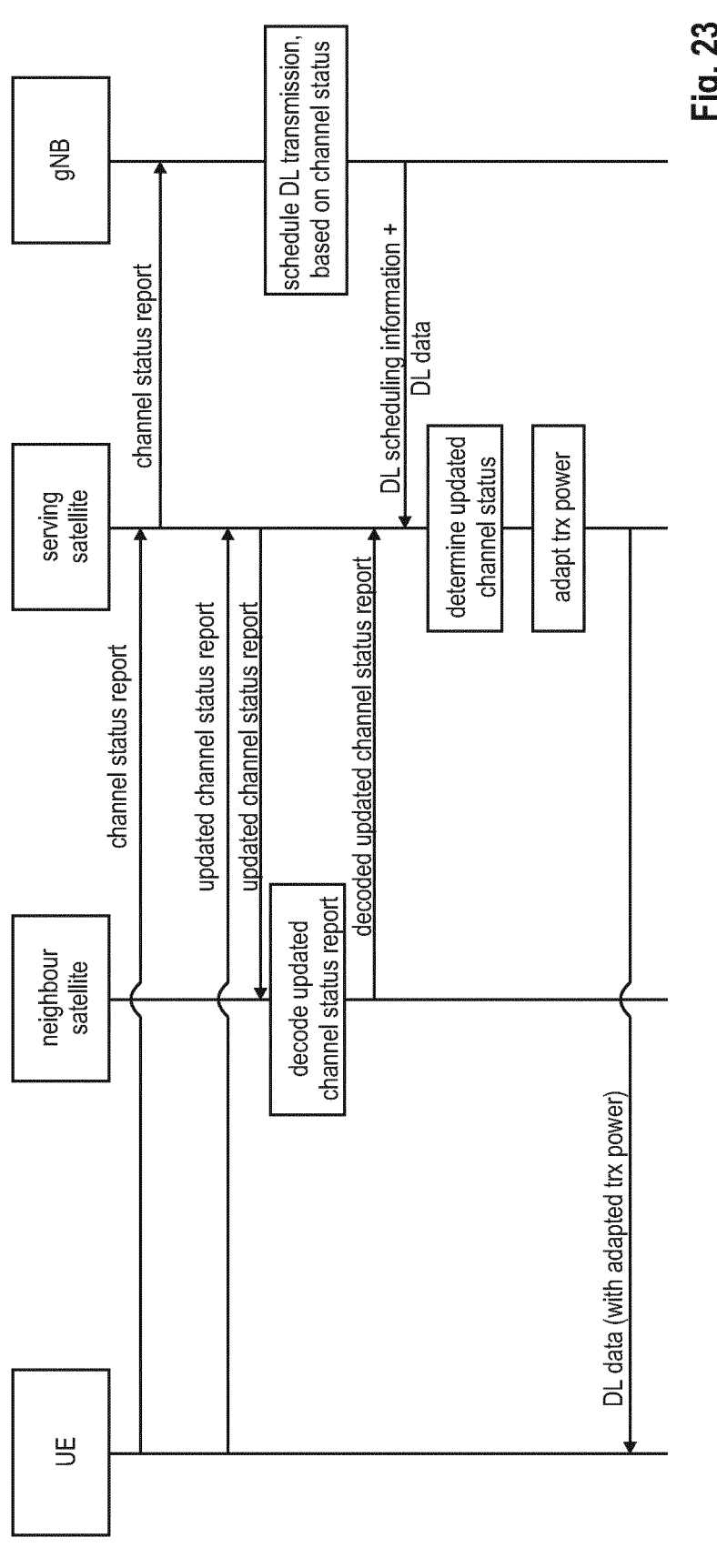
FIG. 23 illustrates a general variant of the improved transmission procedure, where a neighbor satellite decodes the updated channel status report.

According to still another exemplary implementation, as illustrated in FIG. 23, the serving satellite can provide the updated channel status report to the neighbor satellite. This neighbor satellite then decodes the updated channel status report, and returns the decoded information to the serving satellite.

In any case, the above solutions allow that also a simple satellite that serves a UE (simple for instance in that the serving satellite cannot decode an updated channel status report nor determine the updated channel status on its own) can participate in the improved transmission procedure.

The gNB may be responsible to find and configure the neighbor satellite for decoding the updated channel status reports instead of the serving satellite. The configuration thus instructs the neighbor satellite (which has the suitable capability) to receive and decode the updated channel status reports from UEs and to forward them to the corresponding serving satellite. The configuration by the gNB may also indicate the particular radio resources that are used by the UE(s) to transmit the updated channel status report, e.g., such that the neighbor satellite can monitor the corresponding radio resources.

This solution where the neighbor satellite decodes the updated channel status report instead of the serving satellite, is not only but particularly useful for those cases where the round-trip time between the two satellites (neighbor and serving satellite) is smaller than the round-trip time between the serving satellite and the gNB (which could also provide the serving satellite with the updated channel status). According to one exemplary option, the serving satellite may also determine whether to transmit the updated channel status report to the neighbor satellite or the gNB depending on the respective round-trip times between the serving satellite and the gNB and between serving satellite and the neighbor satellite. For instance, the serving satellite may determine to transmit the updated channel status report to the nearest entity, be it the neighbor satellite or the gNB.

Further Aspects

According to a first aspect, a non-terrestrial, NTN, entity, is provided that includes the following. A receiver of the NTN entity receives a channel status report from a user equipment. UE, the channel status report providing information on a channel between the UE and the NTN entity. A transmitter of the NTN entity forwards the received channel status report to a base station. The receiver receives scheduling information from the base station regarding a downlink or uplink transmission of the data with for the UE. A processor of the NTN entity determines an updated channel status. The processor determines whether to adapt a transmission power for the downlink or uplink transmission according to the received scheduling information, based on the updated channel status. The processor, when having determined to adapt the transmission power, adapts the transmission power for the downlink or uplink transmission.

According to a second aspect provided in addition to the first aspect, the scheduling information is for a downlink transmission, and the receiver receives downlink data in association with the downlink scheduling information from the base station. The adaption of the transmission power by the processor comprises adapting the transmission power of the downlink transmission of the received downlink data. The transmitter performs the downlink transmission of the downlink data to the UE according to the downlink scheduling information and based on the adapted transmission power.

According to a third aspect provided in addition to the second aspect, the processor performs, based on the updated channel status, an estimation as to whether or not the scheduled downlink transmission of the downlink data to the UE will be successful. In case the determined estimation is that the scheduled downlink transmission will not be successful, the transmitter transmits a negative acknowledgement for the scheduled downlink transmission to the base station. In an optional implementation, the transmitter performs the scheduled downlink transmission of the downlink data to the UE.

According to a fourth aspect provided in addition to the third aspect, the processor determines, based on the determined estimation, whether or not to cancel the scheduled downlink transmission of the downlink data to the UE. In case it is determined to cancel the scheduled downlink transmission, the scheduled downlink transmission is not performed and the transmission of the negative acknowledgment by the transmitter is performed. In case it is determined not to cancel the scheduled downlink transmission, the scheduled downlink transmission of the downlink data to the UE is performed. In an optional implementation, the determination of the processor determines to cancel the scheduled downlink transmission of the downlink data to the UE, in case the UE is out of coverage of the NTN entity, and the transmitter forwards the downlink data to another NTN entity, which is a target of a handover of the UE from the NTN entity to that other NTN entity.

According to a fifth aspect, provided in addition to one of the second to fourth aspects, the processor determines a priority associated with the downlink data to be forwarded to the UE. The determination of whether to adapt the transmission power of the scheduled downlink or uplink transmission takes the priority associated with the downlink data into account. In an optional implementation, information on the priority associated with the downlink data is included with the data or with the downlink scheduling information regarding the downlink transmission of the downlink data.

According to a sixth aspect, provided in addition to the first aspect, the scheduling information is for an uplink transmission. The adaptation of the transmission power by the processor comprises adapting the transmission power for the uplink transmission of uplink data.

According to a seventh aspect provided in addition to the sixth aspect, the scheduling information received for the uplink transmission comprises a plurality of different uplink scheduling information, the different uplink scheduling information differing at least among each other in a value of transmission power. The adaption of the transmission power by the processor comprises selecting that uplink scheduling information having the most suitable transmission power, based on the updated channel status. The transmitter transmits the selected uplink scheduling information to the UE.

According to an eighth aspect provided in addition to the sixth aspect, the scheduling information received for the uplink transmission indicates a value for a transmission power of the scheduled uplink transmission. The adaptation of the transmission power by the processor comprises adapting the value of the transmission power indicated by the uplink scheduling information to a different value, based on the updated channel status. The transmitter transmits the uplink scheduling information with the different value of the transmission power to the UE.

According to a ninth aspect provided in addition to one of the sixth to eighth aspects, the processor performs, based on the updated channel status, an estimation as to whether or not the scheduled uplink transmission of the uplink data by the UE will be successful. In case the determined estimation is that the scheduled uplink transmission will not be successful, the transmitter transmits a negative acknowledgement for the scheduled uplink transmission to the base station. In an optional implementation, the transmitter transmits the uplink scheduling information to the UE.

According to a tenth aspect provided in addition to the ninth aspect, the processor determines, based on the determined estimation, whether or not to cancel the scheduled uplink transmission of the uplink data by the UE. In case it is determined to cancel the scheduled uplink transmission, the uplink scheduling information is not transmitted to the UE. In case it is determined not to cancel the scheduled uplink transmission, the uplink scheduling information is transmitted to the UE.

According to an eleventh aspect, provided in addition to one of the first to tenth aspects, the receiver monitors negative acknowledgments received from the UE regarding previous downlink transmissions from the NTN entity to the UE. The adaptation of the transmission power by the processor takes into account the monitored negative acknowledgments and optionally negative acknowledgements regarding previous uplink transmissions from the UE to the NTN entity. In an optional implementation, in case the amount of monitored negative acknowledgements is larger than a NACK threshold, the adaptation of the transmission power increases the transmission power.

According to a twelfth aspect, provided in addition to one of the first to eleventh aspects, adapting the transmission power comprises increasing or decreasing the transmission power. In an optional implementation, the transmission power is increased, in case the updated channel status indicates a deteriorated channel status than the previous channel status, provided to the base station. In an optional implementation, the determination of whether to adapt the transmission power for the scheduled downlink or uplink transmission is further based on a minimum transmission-related parameter to be fulfilled for the scheduled transmission.

According to a thirteenth aspect, provided in addition to one of the first to twelfth aspects, the receiver receives an updated channel status report from the UE, and the determining of the updated channel status by the processor is performed based on the received updated channel status report. In addition or alternatively, the processor estimates the updated channel status from one or more of measurements performed on the channel, feedback for the scheduled downlink transmission, and information on the location of the UE.

According to a fourteenth aspect, provided in addition to the thirteenth aspect, the receiver receives a decoded updated channel status report from another NTN entity, having the capability to decode the updated channel status report and having a transmission link to the NTN entity. In an optional implementation, in case the NTN entity is not capable to decode the updated channel status report, the transmitter forwards the updated channel status report to the other NTN entity. In an optional implementation, the transmitter does not forward the updated channel status report to the base station.

According to a fifteenth aspect, provided in addition to the thirteenth or fourteenth aspect, the processor determines dedicated uplink radio resources to be assigned to the UE for transmitting the updated channel status report to the NTN entity. The transmitter provides uplink resource information on the determined dedicated uplink radio resources to the UE. In an optional implementation, the determining of the dedicated uplink radio resources by the processor is performed such that the dedicated uplink radio resources are determined among a pool of uplink radio resources assigned by the base station. In an optional implementation, the processor determines dedicated downlink radio resources to be used by the NTN entity to transmit a reference signal to the UE, for use in determining an updated channel status. In an optional implementation, the determining of the dedicated downlink radio resources by the processor is performed such that the dedicated downlink radio resources are determined among a pool of downlink radio resources assigned by the base station.

According to a sixteenth aspect, provided in addition to one of the thirteenth to fifteenth aspects, the content of the updated channel status report is different from the content of the channel status report. In an optional implementation, the updated channel status report provides an indication of whether or not the channel status has deteriorated compared to the channel status indicated by the previously-received channel status report. In an optional implementation, the receiver performs an energy detection for detecting the presence of the updated channel status report, wherein the presence of the updated channel status report indicates a specific condition at the UE, such as a deterioration of the channel status compared to the channel status indicated by the previously-received channel status report or the UE being out of coverage of the NTN entity. In an optional implementation, the updated channel status report indicates at least one of a current location of the UE, a current movement direction of the UE, and a speed of the UE.

According to a seventeenth aspect, a method is provided comprising the following steps performed by a non-terrestrial network. NTN, entity:

receiving a channel status report from a user equipment, UE, the channel status report providing information on a channel between the UE and the NTN entity, forwarding the received channel status report to a base
    station, receiving scheduling information from the base station
    regarding a downlink or uplink transmission of the data
    with for the UE, determining an updated channel status, determining whether to adapt a transmission power for the
    downlink or uplink transmission according to the
    received scheduling information, based on the updated
    channel status, when having determined to adapt the transmission power,
    adapting the transmission power for the downlink or
    uplink transmission.

According to an eighteenth aspect, a user equipment, UE,
is provided comprising the following. A transmitter of the
UE transmits a channel status report to a non-terrestrial
network. NTN, entity, the channel status report providing
information on a channel between the UE and the NTN
entity. A processor of the UE determines an updated channel
status of the channel between the UE and the NTN entity. A
receiver of the UE receives, from the NTN entity, uplink
scheduling information for an uplink transmission of uplink
data from the UE to the NTN entity. The processor deter-
mines whether to adapt a transmission power of the uplink
transmission of the uplink data, based on the updated
channel status. The processor, when having determined to
adapt the transmission power, adapts the transmission
power. The transmitter performs the uplink transmission of
the uplink data to the NTN entity according to the received
uplink scheduling information and based on the adapted
transmission power.

According to a nineteenth aspect, provided in addition to
the eighteenth aspect, the processor determines, based on the
updated channel status, whether or not to cancel the sched-
uled uplink transmission of the uplink data to the NTN
entity. In case it is determined to cancel the scheduled uplink
transmission, the scheduled uplink transmission is not per-
formed. In case it is determined not to cancel the scheduled
uplink transmission, the scheduled uplink transmission is
performed.

According to a twentieth aspect, provided in addition to
the eighteenth or nineteenth aspect, the determination of
whether to adapt the transmission power of the scheduled
uplink transmission of the uplink data takes into account a
priority of the uplink data. In an optional implementation the
determining whether to adapt the transmission power for the
scheduled uplink transmission is further based on a mini-
mum transmission-related parameter to be fulfilled for the
scheduled uplink transmission.

According to a 21$^{st}$ aspect, provided in addition to one of
the eighteenth to twentieth aspects, the processor determines
whether or not to transmit an updated channel status report
indicating the updated channel status to the NTN entity. In
case the determination of the processor determines to trans-
mit the updated channel status report, the transmitter trans-
mits the updated channel status report to the NTN entity. In
an optional implementation, the determination of the pro-
cessor of whether or not to transmit the updated channel
status report comprises that at least one condition is fulfilled.
In an optional implementation, one of the at least one
condition is that the channel status deteriorated compared to
the channel status indicated by the previously-transmitted
channel status report.

According to a 22$^{nd}$ aspect, provided in addition to the 21$^{st}$
aspect, the receiver receives uplink resource information
from the NTN entity, the uplink resource information indi-
cating uplink radio resources usable by the UE to transmit the updated channel status report to the NTN entity. The
transmission of the updated channel status report by the
transmitter uses the indicated uplink radio resources.

According to a 23$^{rd}$ aspect, provided in addition to the 21$^{st}$
or 22$^{nd}$ aspect, the transmitter transmits the updated channel
status report to another NTN entity, wherein the other NTN
entity has the capability to decode the updated channel status
report and has a transmission link to the NTN entity. In an
optional implementation, the UE is connected to the NTN
entity and the other NTN entity simultaneously.

According to a 24$^{th}$ aspect, provided in addition to one of
the eighteenth to 23$^{rd}$ aspects, the receiver receives a down-
link data transmission from the NTN entity. The receiver
receives a NACK indication from the NTN entity, indicating
that a negative acknowledgement was already transmitted to
a base station for the downlink data transmission. The
processor determines to not transmit a negative acknowl-
edgment for the received downlink data transmission even
when decoding of the received downlink data transmission
is not successful.

According to a 25$^{th}$ aspect, provided in addition to one of
the 21$^{st}$ to 24$^{th}$ aspects, the content of the updated channel
status report is different from the content of the channel
status report. In an optional implementation, the updated
channel status report provides an indication of whether or
not the channel status has deteriorated compared to the
channel status indicated by the previously-transmitted chan-
nel status report. In an optional implementation, the trans-
mitter performs the transmission of the updated channel
status report such that the receiver of the NTN entity is able
to detect the presence of the transmission of the updated
channel status report based on an energy detection, wherein
transmitting the updated channel status report indicates a
deterioration of the channel status compared to the channel
status indicated by the previously-received channel status
report. In an optional implementation, the updated channel
status report indicates at least one of a current location of the
UE, a current movement direction of the UE, and a speed of
the UE.

According to a 26$^{th}$ aspect, a method is provided com-
prising the following steps performed by a user equipment,
UE:

transmitting a channel status report to a non-terrestrial
        network, NTN, entity, the channel status report provid-
        ing information on a channel between the UE and the
        NTN entity, determining an updated channel status of the channel
        between the UE and the NTN entity, receiving, from the NTN entity, uplink scheduling infor-
        mation for an uplink transmission of uplink data from
        the UE to the NTN entity, determining whether to adapt a transmission power of the
        uplink transmission of the uplink data, based on the
        updated channel status, when having determined to adapt the transmission power,
        adapting the transmission power, performing the uplink transmission of the uplink data to
        the NTN entity according to the received uplink sched-
        uling information and based on the adapted transmis-
        sion power.

According to a 27$^{th}$ aspect, a base station is provided
comprising the following. A receiver of the base station
receives a channel status report from a non-terrestrial net-
work. NTN, entity providing information on a channel
between a user equipment, UE, and the NTN entity. A
processor prepares a plurality of different uplink scheduling
information for transmission of uplink data by the UE based on the received channel status report, the different uplink scheduling information at least differing among each other in a value of transmission power. A transmitter transmits the prepared plurality of different uplink scheduling information to the NTN entity.

According to a 28th aspect, provided in addition to the 27th aspect, the processor determines a pool of radio resources, usable by the UE to transmit an updated channel status report to the NTN entity. The transmitter transmits information on the determined pool of radio resources to the NTN entity. In an optional implementation, the transmitter transmits a configuration message to the NTN entity for configuring the NTN entity to not forward the updated channel status report to the base station.

According to a 29th aspect, provided in addition to the 27th or 28th aspect, the transmitter transmits a configuration message to another NTN entity that has the capability to decode updated channel status reports and has a transmission link to the NTN entity. The configuration message configures the other NTN entity to receive and decode updated channel status reports from UEs and to forward them to the NTN entity that is serving the UEs. In an optional implementation, the configuration message indicates radio resources usable by the UEs to transmit the update channel status reports.

According to a 30th aspect, provided in addition to one of the 27th to 29th aspects, the receiver receives, from the NTN entity, a negative acknowledgement for a previously-scheduled downlink transmission of downlink data to the UE, the negative acknowledgement further indicating that the NTN entity cancelled the previously-scheduled downlink transmission of the downlink data to the UE. The processor determines, based on the negative acknowledgement, to perform a re-transmission of the downlink data for the UE as if it was a first transmission of the downlink data and not a re-transmission. The transmitter re-transmits downlink scheduling information and the downlink data to the NTN entity to be forwarded to the UE. In an optional implementation, the downlink scheduling information for the downlink data indicates that the transmitted downlink data is new downlink data as if it was the first transmission of the downlink data and not a re-transmission.

According to a 31st aspect, provided in addition to one of the 27th to 29th aspects, the receiver receives, from the NTN entity, a negative acknowledgement for a previously-scheduled downlink transmission of downlink data to the UE. The processor determines, based on the negative acknowledgement, to perform a re-transmission of the downlink data for the UE. The transmitter re-transmits the downlink scheduling information and the downlink data to the NTN entity to be forwarded to the UE, optionally using a different version of the downlink data for the re-transmission.

According to a 32nd aspect, provided in addition to the 30th or 31st aspect, the transmitter transmits information on the priority of the downlink data to the NTN entity. In an optional implementation, the priority information is included with the downlink data or with the downlink scheduling information regarding the transmission of the downlink data. In an optional implementation, the transmitter transmits a minimum transmission-related parameter to the NTN entity. The minimum transmission-related parameter indicates a minimum condition to be fulfilled by the scheduled transmission and is to be used in the process of determining whether to adapt the transmission power for the scheduled transmission.

According to a 33rd aspect, provided in addition to one of the 27nd to 32nd aspects, the different uplink scheduling information furthermore differ among each other in a value of a modulation order or a value of a coding rate of the uplink data.

According to a 34th aspect, a method is provided comprising the following steps performed by a base station:
  receiving a channel status report from a non-terrestrial network, NTN, entity providing information on a channel between a user equipment, UE, and the NTN entity,
  preparing a plurality of different uplink scheduling information for transmission of uplink data by the UE based on the received channel status report, the different uplink scheduling information at least differing among each other in a value of transmission power.
  transmitting the prepared plurality of different uplink scheduling information to the NTN entity.

According to a 35th aspect, an integrated circuit is provided, which, in operation, controls a process of a non-terrestrial network, NTN, entity, the process comprising the following steps performed by the NTN entity:
  receiving a channel status report from a user equipment. UE, the channel status report providing information on a channel between the UE and the NTN entity,
  forwarding the received channel status report to a base station,
  receiving scheduling information from the base station regarding a downlink or uplink transmission of the data with for the UE,
  determining an updated channel status.
  determining whether to adapt a transmission power for the downlink or uplink transmission according to the received scheduling information, based on the updated channel status,
  when having determined to adapt the transmission power, adapting the transmission power for the downlink or uplink transmission.

According to a 36th aspect, an integrated circuit is provided, which, in operation, controls a process of a user equipment, the process comprising the following steps performed by the user equipment:
  transmitting a channel status report to a non-terrestrial network, NTN, entity, the channel status report providing information on a channel between the UE and the NTN entity,
  determining an updated channel status of the channel between the UE and the NTN entity,
  receiving, from the NTN entity, uplink scheduling information for an uplink transmission of uplink data from the UE to the NTN entity.
  determining whether to adapt a transmission power of the uplink transmission of the uplink data, based on the updated channel status,
  when having determined to adapt the transmission power, adapting the transmission power,
  performing the uplink transmission of the uplink data to the NTN entity according to the received uplink scheduling information and based on the adapted transmission power.

According to a 37th aspect, an integrated circuit, which, in operation, controls a process of a base station, the process comprising the following steps performed by the base station:
  receiving a channel status report from a non-terrestrial network, NTN, entity providing information on a channel between a user equipment, UE, and the NTN entity,
  preparing a plurality of different uplink scheduling information for transmission of uplink data by the UE based on the received channel status report, the different uplink scheduling information at least differing among each other in a value of transmission power, transmitting the prepared plurality of different uplink scheduling information to the NTN entity.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Control Signals

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

Base Station

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

Uplink/Downlink/Sidelink

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH. PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

Data Channels/Control Channels

The present disclosure may be applied to any of data channels and control channels. The channels in the present disclosure may be replaced with data channels including PDSCH. PUSCH and PSSCH and/or control channels including PDCCH, PUCCH, PBCH, PSCCH, and PSBCH.

Reference Signals

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

Time Intervals

In the present disclosure, time resource units are not limited to one or a combination of slots and symbols, and may be time resource units, such as frames, superframes, subframes, slots, time slot subslots, minislots, or time resource units, such as symbols. Orthogonal Frequency Division Multiplexing (OFDM) symbols. Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

Frequency Bands

The present disclosure may be applied to any of a licensed band and an unlicensed band.

Communication

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

Antenna Ports

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM. EEPROM, flash memory, registers, hard disks. CD-ROM. DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A non-terrestrial network (NTN) entity, comprising:
a receiver, which, in operation, receives a channel status report from a user equipment (UE), the channel status report providing information on a channel between the UE and the NTN entity;
a transmitter, which, in operation, forwards the received channel status report to a base station;
wherein the receiver, when in operation, receives scheduling information from the base station regarding a downlink or uplink transmission of data for the UE; and
a processor, which, in operation, determines an updated channel status;
wherein the processor, in operation, determines whether to adapt a transmission power for the downlink or uplink transmission according to the received scheduling information, based on the updated channel status,
wherein the processor, when having determined to adapt the transmission power, adapts the transmission power for the downlink or uplink transmission,
wherein adapting the transmission power comprises increasing or decreasing the transmission power,
wherein the transmission power is increased, in case the updated channel status indicates a deteriorated channel status than the previous channel status, provided to the base station, and
wherein the determination whether to adapt the transmission power for the scheduled downlink or uplink transmission is further based on a minimum transmission-related parameter to be fulfilled for the scheduled transmission.

2. The NTN entity according to claim 1, wherein the scheduling information is for a downlink transmission, and the receiver, when in operation, receives downlink data in association with the downlink scheduling information from the base station,
wherein the adaption of the transmission power by the processor comprises adapting the transmission power of the downlink transmission of the received downlink data, and
wherein the transmitter, when in operation, performs the downlink transmission of the downlink data to the UE according to the downlink scheduling information and based on the adapted transmission power.

3. The NTN entity according to claim 2, wherein the processor, when in operation, performs, based on the updated channel status, an estimation as to whether or not the scheduled downlink transmission of the downlink data to the UE will be successful,
in case the determined estimation is that the scheduled downlink transmission will not be successful, the transmitter transmits a negative acknowledgement for the scheduled downlink transmission to the base station, and
wherein the transmitter performs the scheduled downlink transmission of the downlink data to the UE.

4. The NTN entity according to claim 3, wherein the processor, when in operation, determines, based on the determined estimation, whether or not to cancel the scheduled downlink transmission of the downlink data to the UE, and
in case it is determined to cancel the scheduled downlink transmission, the scheduled downlink transmission is not performed and the transmission of the negative acknowledgment by the transmitter is performed, in case it is determined not to cancel the scheduled downlink transmission, the scheduled downlink transmission of the downlink data to the UE is performed, and wherein the determination of the processor determines to cancel the scheduled downlink transmission of the downlink data to the UE, in case the UE is out of coverage of the NTN entity, and the transmitter, when in operation, forwards the downlink data to another NTN entity, which is a target of a handover of the UE from the NTN entity to that other NTN entity.

5. The NTN entity according to claim 2, wherein the processor, when in operation, determines a priority associated with the downlink data to be forwarded to the UE, and wherein the determination of whether to adapt the transmission power of the scheduled downlink or uplink transmission takes the priority associated with the downlink data into account, wherein information on the priority associated with the downlink data is included with the data or with the downlink scheduling information regarding the downlink transmission of the downlink data.

6. The NTN entity according to claim 1, wherein the scheduling information is for an uplink transmission, and wherein the adaptation of the transmission power by the processor comprises adapting the transmission power for the uplink transmission of uplink data.

7. The NTN entity according to claim 6, wherein the scheduling information received for the uplink transmission comprises a plurality of different uplink scheduling information, the different uplink scheduling information differing at least among each other in a value of transmission power, wherein the adaption of the transmission power by the processor comprises selecting that uplink scheduling information having the most suitable transmission power, based on the updated channel status, and wherein the transmitter, when in operation, transmits the selected uplink scheduling information to the UE.

8. The NTN entity according to claim 6, wherein the scheduling information received for the uplink transmission indicates a value for a transmission power of the scheduled uplink transmission, wherein the adaptation of the transmission power by the processor comprises adapting the value of the transmission power indicated by the uplink scheduling information to a different value, based on the updated channel status, and wherein the transmitter, when in operation, transmits the uplink scheduling information with the different value of the transmission power to the UE.

9. The NTN entity according to claim 6, wherein the processor, when in operation, performs, based on the updated channel status, an estimation as to whether or not the scheduled uplink transmission of the uplink data by the UE will be successful, in case the determined estimation is that the scheduled uplink transmission will not be successful, the transmitter transmits a negative acknowledgement for the scheduled uplink transmission to the base station, and wherein the transmitter transmits the uplink scheduling information to the UE.

10. The NTN entity according to claim 9, wherein the processor, when in operation, determines, based on the determined estimation, whether or not to cancel the scheduled uplink transmission of the uplink data by the UE, and in case it is determined to cancel the scheduled uplink transmission, the uplink scheduling information is not transmitted to the UE, and in case it is determined not to cancel the scheduled uplink transmission, the uplink scheduling information is transmitted to the UE.

11. The NTN entity according to claim 1, wherein the receiver, when in operation, monitors negative acknowledgments received from the UE regarding previous downlink transmissions from the NTN entity to the UE, wherein the adaptation of the transmission power by the processor takes into account the monitored negative acknowledgments and negative acknowledgements regarding previous uplink transmissions from the UE to the NTN entity, and wherein in case the amount of monitored negative acknowledgements is larger than a negative acknowledgement (NACK) threshold, the adaptation of the transmission power increases the transmission power.

12. The NTN entity according to claim 1, wherein the receiver, when in operation, receives an updated channel status report from the UE, and the determining of the updated channel status by the processor is performed based on the received updated channel status report, and/or wherein the processor estimates the updated channel status from one or more of measurements performed on the channel, feedback for the scheduled downlink transmission, and information on the location of the UE.

13. The NTN entity according to claim 12, wherein the receiver, when in operation, receives a decoded updated channel status report from another NTN entity, having the capability to decode the updated channel status report and having a transmission link to the NTN entity, wherein in case the NTN entity is not capable to decode the updated channel status report, the transmitter, when in operation, forwards the updated channel status report to the other NTN entity, and wherein the transmitter does not forward the updated channel status report to the base station.

14. The NTN entity according to claim 12, wherein the processor, when in operation, determines dedicated uplink radio resources to be assigned to the UE for transmitting the updated channel status report to the NTN entity, wherein the transmitter, when in operation, provides uplink resource information on the determined dedicated uplink radio resources to the UE, wherein the determining of the dedicated uplink radio resources by the processor is performed such that the dedicated uplink radio resources are determined among a pool of uplink radio resources assigned by the base station, and wherein the processor, when in operation, determines dedicated downlink radio resources to be used by the NTN entity to transmit a reference signal to the UE, for use in determining an updated channel status, wherein the determining of the dedicated downlink radio resources by the processor is performed such that the dedicated downlink radio resources are determined among a pool of downlink radio resources assigned by the base station.

15. The NTN entity according to claim 12, wherein the content of the updated channel status report is different from the content of the channel status report, wherein the updated channel status report provides an indication of whether or not the channel status has deteriorated compared to the channel status indicated by the previously-received channel status report, wherein the receiver performs an energy detection for detecting the presence of the updated channel status report, wherein the presence of the updated channel status report indicates a specific condition at the UE, such as a deterioration of the channel status compared to the channel status indicated by the previously-received channel status report or the UE being out of coverage of the NTN entity, and wherein the updated channel status report indicates at least one of a current location of the UE, a current movement direction of the UE, and a speed of the UE.

16. A user equipment (UE), comprising:

a transmitter, which, in operation, transmits a channel status report to a non-terrestrial network (NTN) entity, the channel status report providing information on a channel between the UE and the NTN entity;

a processor, which, in operation, determines an updated channel status of the channel between the UE and the NTN entity; and a receiver, which, in operation, receives, from the NTN entity, uplink scheduling information for an uplink transmission of uplink data from the UE to the NTN entity;

wherein the processor, when in operation, determines whether to adapt a transmission power of the uplink transmission of the uplink data, based on the updated channel status, wherein the processor, when having determined to adapt the transmission power, adapts the transmission power, wherein the transmitter, when in operation, performs the uplink transmission of the uplink data to the NTN entity according to the received uplink scheduling information and based on the adapted transmission power, wherein the determination of whether to adapt the transmission power of the scheduled uplink transmission of the uplink data takes into account a priority of the uplink data, and wherein the determining whether to adapt the transmission power for the scheduled uplink transmission is further based on a minimum transmission-related parameter to be fulfilled for the scheduled uplink transmission.

17. The UE according to claim 16, wherein the processor, when in operation, determines, based on the updated channel status, whether or not to cancel the scheduled uplink transmission of the uplink data to the NTN entity, in case it is determined to cancel the scheduled uplink transmission, the scheduled uplink transmission is not performed, and in case it is determined not to cancel the scheduled uplink transmission, the scheduled uplink transmission is performed.

18. A base station comprising:

a receiver, which, in operation, receives a channel status report from a non-terrestrial network (NTN) entity providing information on a channel between a user equipment (UE) and the NTN entity;

a processor, which, in operation, prepares a plurality of different uplink scheduling information for transmission of uplink data by the UE based on the received channel status report, the different uplink scheduling information at least differing among each other in a value of transmission power;

a transmitter, which, in operation, transmits the prepared plurality of different uplink scheduling information to the NTN entity, wherein the transmission power of the scheduled uplink transmission of the uplink data is adapted based on a priority of the uplink data, and wherein the transmission power of the scheduled uplink transmission of the uplink data is adapted further based on a minimum transmission-related parameter to be fulfilled for the scheduled uplink transmission.

* * * * *